US012793728B2

(12) United States Patent
Krukowicz et al.

(10) Patent No.: US 12,793,728 B2
(45) Date of Patent: Nov. 10, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Tomasz Krukowicz, Warsaw (PL); Marcin Goździewski, Warsaw (PL); Krzysztof Arendt, Warsaw (PL); Jakub Tkaczuk, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 193 days.

(21) Appl. No.: 18/745,390

(22) Filed: Jun. 17, 2024

(65) Prior Publication Data

US 2025/0029623 A1 Jan. 23, 2025

(30) Foreign Application Priority Data

Jul. 18, 2023 (KR) ........................ 10-2023-0093088

(51) Int. Cl.
*G10L 21/0208* (2013.01)
*G06N 3/08* (2023.01)
(Continued)

(52) U.S. Cl.
CPC ................................ *G10L 21/0208* (2013.01)

(58) Field of Classification Search
None
See application file for complete search history.

(56) References Cited

U.S. PATENT DOCUMENTS 7,464,029 B2 12/2008 Visser et al.
9,892,731 B2 2/2018 Kristjansson
(Continued)

FOREIGN PATENT DOCUMENTS

EP 3602550 B1 5/2021
KR 101807961 B1 12/2017
(Continued)

OTHER PUBLICATIONS

Fedorov, I. et al. "TinyLSTMs: Efficient Neural Speech Enhancement for Hearing Aids", https://doi.org/10.48550/arXiv.2005.11138, Bose Corp solution for speech enhancement using LSTM neural network, tailored for real time applications, end to end speech enhancement using single LSTM network, May 20, 2020.
(Continued)

*Primary Examiner* — Pierre Louis Desir
*Assistant Examiner* — Kristen Michelle Masters
(74) *Attorney, Agent, or Firm* — Nixon & Vanderhye, P.C.

(57) ABSTRACT

An example electronic apparatus includes a memory configured to store at least one instruction and at least one processor connected to the memory to control the electronic apparatus. The at least one processor is configured to, by executing the at least one instruction, obtain a first audio signal including a voice signal and a noise signal, convert the first audio signal in a time domain to a second audio signal in a frequency domain, obtain a first gain value representing a Signal-to-Noise Ratio (SNR) from the second audio signal, obtain a second gain value with a first dynamic range by filtering the first gain value, obtain a third gain value by inputting the second gain value to a neural network model trained to output a signal from which noise is removed, and convert the second audio signal to a third audio signal from which at least a portion of the noise signal is removed, using the third gain value.

12 Claims, 21 Drawing Sheets

(51) Int. Cl.

| | |
|---|---|
| ***G10L 15/12*** | (2006.01) |
| ***G10L 19/26*** | (2013.01) |
| ***G10L 21/0232*** | (2013.01) |
| ***G10L 25/30*** | (2013.01) |

(56) References Cited

U.S. PATENT DOCUMENTS

| | | | | |
|---|---|---|---|---|
| 10,499,139 | B2 | 12/2019 | Ganeshkumar | |
| 10,535,362 | B2 | 1/2020 | Bryan et al. | |
| 11,043,231 | B2 | 6/2021 | Cho et al. | |
| 11,146,607 | B1* | 10/2021 | Tang | G10L 21/0208 |
| 11,348,575 | B2 | 5/2022 | Cho et al. | |
| 11,875,813 | B2* | 1/2024 | Mesgarani | G06N 3/0442 |
| 2015/0112672 | A1* | 4/2015 | Giacobello | H04M 9/082 704/233 |
| 2017/0365275 | A1* | 12/2017 | Lee | G10L 15/063 |
| 2019/0222943 | A1 | 7/2019 | Andersen et al. | |
| 2020/0059740 | A1 | 2/2020 | Xu et al. | |
| 2022/0078551 | A1 | 3/2022 | Stamenovic et al. | |
| 2022/0225023 | A1 | 7/2022 | Maruri et al. | |
| 2022/0232331 | A1* | 7/2022 | Jelcicová | H04R 25/407 |
| 2022/0293119 | A1 | 9/2022 | Elkhatib et al. | |
| 2022/0406325 | A1 | 12/2022 | Kitamura et al. | |
| 2023/0029267 | A1 | 1/2023 | Zhang et al. | |
| 2023/0154483 | A1* | 5/2023 | Ding | G10L 19/008 704/200 |
| 2023/0267947 | A1* | 8/2023 | Shuang | G10L 21/0208 704/233 |
| 2023/0320903 | A1 | 10/2023 | Kurihara | |
| 2023/0360662 | A1* | 11/2023 | Shuang | G10L 21/0208 |
| 2024/0304186 | A1* | 9/2024 | Shin | G10L 15/16 |

FOREIGN PATENT DOCUMENTS

| | | | |
|---|---|---|---|
| KR | 20210073975 | A | 6/2021 |
| WO | 2022256577 | A1 | 12/2022 |
| WO | 2022259589 | A1 | 12/2022 |

OTHER PUBLICATIONS

Strake, M. et al., "Speech enhancement by LSTM-based noise suppression followed by CNN-based speech restoration". EURASIP J. Adv. Signal Process. 2020, 49 (2020). https://doi.org/10.1186/s13634-020-00707-1, speech enhancement using two stage neural network processors.

Lotter, T. et al., "Speech Enhancement by MAP Spectral Amplitude Estimation Using a Super-Gaussian Speech Model." EURASIP J. Adv. Signal Process. 2005, 354850 (2005). https://doi.org/10.1155/ASP.2005.1110, classical paper exploring maximum aposteriori statistical inference for speech enhancement.

Cohen, Israel et al. "Speech enhancement for non-stationary noise environments." Signal processing 81.11 (2001): 2403-2418, classical paper providing low complexity (in comparison to neural networks) method for speech enhancement exploring statistical inference for noise level estimation and speech presence probability.

Zhou, M. et al. "Control Theory-Inspired Model Design for Single Image De-Raining", in IEEE Transactions on Circuits and Systems II: Express Briefs, vol. 69, No. 2, pp. 649-653, Feb. 2022, doi: 10.1109/TCSII.2021.3100704. Neural network correcting classical image processing algorithm.

Carvalho, E. et al., "Neural Enhanced Control for Quadrotor Linear Behavior Fitting," 2022 International Conference on Unmanned Aircraft Systems (ICUAS), Dubrovnik, Croatia, 2022, pp. 378-385, doi: 10.1109/ICUAS54217.2022.9836058.

* cited by examiner

ELECTRONIC APPARATUS AND CONTROLLING METHOD THEREOF

CROSS-REFERENCE TO RELATED APPLICATIONS

This application is based on and claims priority under 35 U.S.C. § 119(a) of Korean Patent Application No. 10-2023-0093088, filed on Jul. 18, 2023, in the Korean Intellectual Property Office, the disclosure of which is incorporated by reference herein in its entirety.

BACKGROUND

1. Field

The present disclosure relates to an electronic apparatus and a controlling method thereof and, for example, to an electronic apparatus that removes a noise signal from an audio signal and a controlling method thereof.

2. Description of Related Art

Depending on an environment in which sound is collected, the sound may include noise signals. If the content of a conversation is important, such as in a phone call or video conference, noise signals can make it difficult to communicate.

Noise canceling can be used to remove a noise signal from a normal audio signal. A noise canceling function may, for example, generate a signal in an opposite direction of the noise signal and merge it with the existing noise signal.

However, even if a noise signal in the opposite direction is generated, it may be difficult to cancel the noise signal completely.

Even if the noise signal is removed using an artificial intelligence model, there is a problem of low accuracy in identifying only the noise signal. In addition, if the data input to an artificial intelligence model is different from the existing learning data, there may be a problem in that the accuracy of a function to remove the noise signal can decrease.

SUMMARY

The present disclosure can provide an electronic apparatus that generates an audio signal from which a noise signal is removed using a gain value associated with a signal-to-noise ratio between a voice signal and the noise signal and a controlling method thereof.

An electronic apparatus according to an embodiment may include a memory configured to store at least one instruction and at least one processor connected to the memory to control the electronic apparatus. The at least one processor may be configured to, by executing the at least one instruction, obtain a first audio signal including a voice signal and a noise signal, convert the first audio signal in a time domain to a second audio signal in a frequency domain, obtain a first gain value representing a Signal-to-Noise Ratio (SNR) from the second audio signal, obtain a second gain value with a first dynamic range by filtering the first gain value, obtain a third gain value by inputting the second gain value to a neural network model trained to output a signal from which noise is removed, and convert the second audio signal to a third audio signal from which at least a portion of the noise signal is removed, using the third gain value.

In an embodiment, the at least one processor may be configured to back-convert the third audio signal in a frequency domain to a fourth audio signal in a time domain.

In an embodiment, the at least one processor may be configured to convert the first audio signal to the second audio signal using Short-Time Fourier Transform (STFT).

In an embodiment, the at least one processor may be configured to obtain at least one of a first noise value, a first posteriori SNR or a first priori SNR based on a second audio signal, and obtain the first gain value based on at least one of the first noise value, the first posteriori SNR or the first priori SNR.

In an embodiment, the at least one processor may be configured to obtain the first noise value from the second audio signal based on a first parameter stored in the memory, obtain the first posteriori SNR from the second audio signal and the first noise value based on a second parameter stored in the memory, obtain the first priori SNR from second audio signal and the first posteriori SNR based on a third parameter stored in the memory, and obtain the first gain value from the second audio signal and the first priori SNR based on a fourth parameter stored in the memory.

In an embodiment, the at least one processor may be configured to obtain a second noise value with a second dynamic range by filtering the first noise value, obtain a second posterior SNR with a third dynamic range by filtering the first posteriori SNR, and obtain a second priori SNR with a fourth dynamic range by filtering the first priori SNR.

In an embodiment, the at least one processor may be configured to obtain the third gain value by inputting the second gain value, the second noise value, the second posterior SNR, and the second priori SNR to the trained neural network model.

In an embodiment, the at least one processor may be configured to identify a noise component corresponding to the second audio signal based on the third gain value, and convert the second audio signal to the third audio signal by removing the noise component from the second audio signal.

In an embodiment, the at least one processor may be configured to identify the noise signal based on the first audio signal, generate a reverse noise signal based on the noise signal, obtain a first filtering signal by combining the first audio signal and the reverse noise signal, and convert the second audio signal to the third audio signal based on the first filtering signal and the third gain value.

In an embodiment, the electronic apparatus may further include a communication interface connected to an external device, and the at least one processor may be configured to obtain the first audio signal from the external device through the communication interface.

A controlling method of an electronic apparatus according to an embodiment includes obtaining a first audio signal including a voice signal and a noise signal, converting the first audio signal in a time domain to a second audio signal in a frequency domain, obtaining a first gain value representing a Signal-to-Noise Ratio (SNR) from the second audio signal, obtaining a second gain value with a first dynamic range by filtering the first gain value, obtaining a third gain value by inputting the second gain value to a neural network model trained to output a signal from which noise is removed, and converting the second audio signal to a third audio signal from which at least a portion of the noise signal is removed, using the third gain value.

In an embodiment, the controlling method may further include back-converting the third audio signal in a frequency domain to a fourth audio signal in a time domain.

In an embodiment, the converting of the first audio signal to the second audio signal may include converting the first audio signal to the second audio signal using Short-Time Fourier Transform (STFT).

In an embodiment, the obtaining of a first gain value may include obtaining at least one of a first noise value, a first posteriori SNR or a first priori SNR based on a second audio signal, and obtaining the first gain value based on at least one of the first noise value, the first posteriori SNR or the first priori SNR.

In an embodiment, the obtaining of a first gain value may include obtaining the first noise value from the second audio signal based on a first parameter stored in the electronic apparatus, obtaining the first posteriori SNR from the second audio signal and the first noise value based on a second parameter stored in the electronic apparatus, obtaining the first priori SNR from second audio signal and the first posteriori SNR based on a third parameter stored in the electronic apparatus, and obtaining the first gain value from the second audio signal and the first priori SNR based on a fourth parameter stored in the electronic apparatus.

In an embodiment, the controlling method may further include obtaining a second noise value with a second dynamic range by filtering the first noise value, obtaining a second posterior SNR with a third dynamic range by filtering the first posteriori SNR, and obtaining a second priori SNR with a fourth dynamic range by filtering the first priori SNR.

In an embodiment, the obtaining of a third gain value may include obtaining the third gain value by inputting the second gain value, the second noise value, the second posterior SNR, and the second priori SNR to the trained neural network model.

In an embodiment, the converting of the second audio signal to the third audio signal may include identifying a noise component corresponding to the second audio signal based on the third gain value, and converting the second audio signal to the third audio signal by removing the noise component from the second audio signal.

In an embodiment, the controlling method may further include identifying the noise signal based on the first audio signal, generating a reverse noise signal based on the noise signal, and obtaining a first filtering signal by combining the first audio signal and the reverse noise signal, and the converting of the second audio signal to the third audio signal may include converting the second audio signal to the third audio signal based on the first filtering signal and the third gain value.

In an embodiment, the obtaining of a first audio signal may include obtaining the first audio signal from the external device connected to the electronic apparatus.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
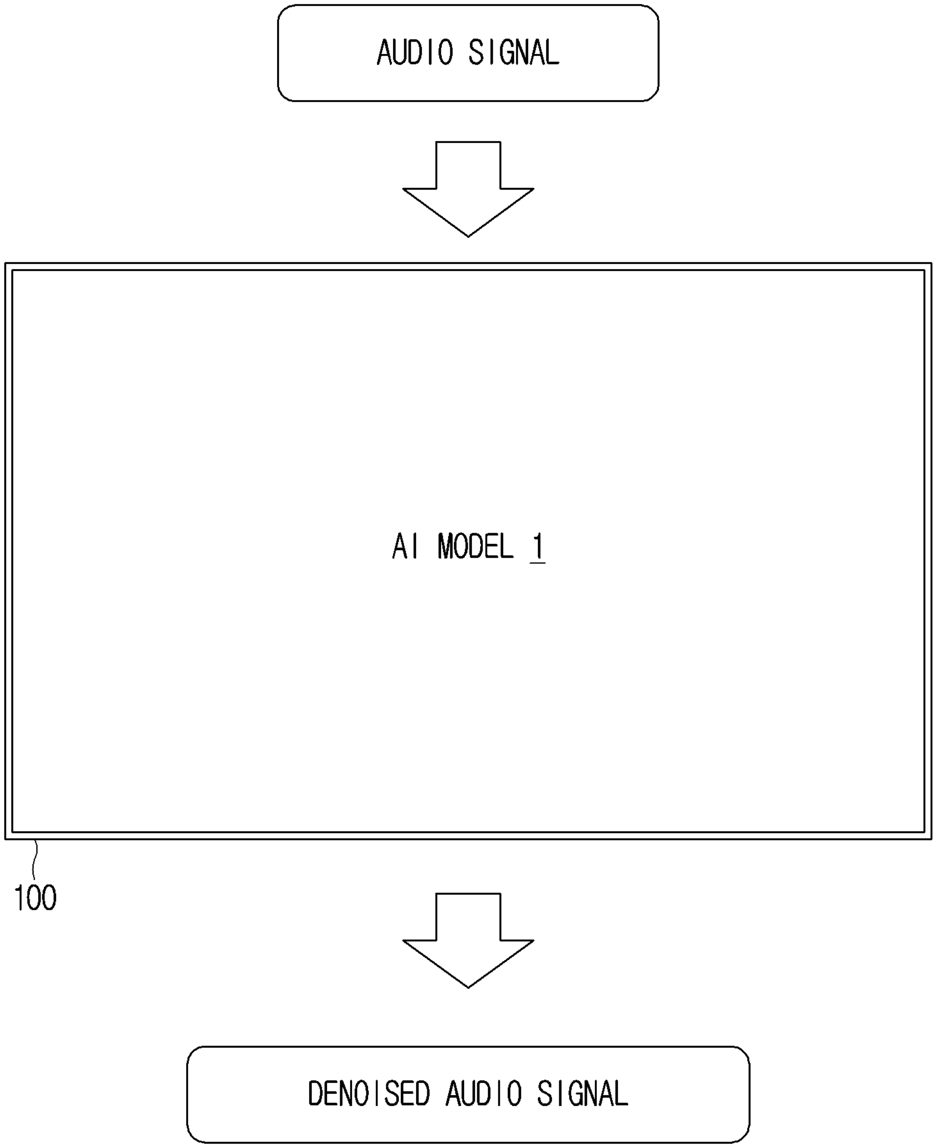
FIG. 1 is view provided to explain an artificial intelligence (AI) model for removing a noise signal.

Hereinafter, the disclosure is described in detail with reference to the accompanying drawings.

General terms that are currently widely used are selected as the terms used in embodiments of the disclosure in consideration of their functions in the disclosure, and may be changed based on the intention of those skilled in the art or a judicial precedent, the emergence of a new technique, or the like. In addition, in a specific case, terms arbitrarily chosen by applicant may exist. In this case, the meanings of such terms are mentioned in detail in corresponding descriptions of the disclosure. Therefore, the terms used in the embodiments of the disclosure need to be defined on the basis of the meanings of the terms and the contents throughout the disclosure rather than simple names of the terms.

In the disclosure, an expression "have", "may have", "include", "may include" or the like, indicates the existence of a corresponding feature (for example, a numerical value, a function, an operation or a component such as a part), but does not exclude the existence of an additional feature.

An expression, “at least one of A or/and B” should be understood as indicating any one of “A”, “B” and “both of A and B.”

Expressions “first”, “second”, and the like, used in the disclosure may indicate various components regardless of the sequence or importance of the components. These expressions are used only to distinguish one component from another component, and do not limit the corresponding components.

In a case that any component (for example, a first component) is mentioned to be “(operatively or communicatively) coupled with/to” or “connected to” another component (for example, a second component), it is to be understood that any component may be directly coupled to another component or may be coupled to another component through still another component (for example, a third component).

A term of a singular number may include its plural number unless explicitly indicated otherwise in the context. It is to be understood that a term “include”, “formed of”, or the like used in the application specifies the presence of features, numerals, steps, operations, components, parts, or combinations thereof, mentioned in the specification, but does not preclude the presence or addition of one or more other features, numerals, steps, operations, components, parts, or combinations thereof.

In the embodiments, a “module” or a “~er/or” may perform at least one function or operation, and be implemented by hardware or software, or be implemented by a combination of hardware and software. In addition, a plurality of “modules” or a plurality of “~ers/ors” may be integrated in at least one module and implemented by at least one processor (not illustrated) except for a “module” or an “~er/or” that needs to be implemented by specific hardware.

In this specification, the term ‘user’ may refer to a person using an electronic apparatus or a device (e.g., artificial intelligence electronic device) using the electronic apparatus.

Hereinafter, the present disclosure will be described in greater detail with reference to the accompanying drawings.

FIG. 1 is view provided to explain an artificial intelligence (AI) model for removing a noise signal.

Referring to FIG. 1, an electronic apparatus 100 may include an AI model 1. The AI model 1 may be, for example, a model for removing noise signals from input data. The AI model 1 may remove a noise signal from a mixed signal included in the input data. The input data may include general signals and audio signals. The input data may be described as audio signals.

Upon receiving an audio signal, the AI model 1 may distinguish between noise and non-noise signals included in the audio signal. The AI model 1 may remove the noise signal from the audio signal to obtain output data. The output data may be described as a denoised audio signal.

The AI model 1 may include at least one module. At least one module of the plurality of modules included in the AI model 1 may be implemented as an AI module. For example, the AI model 1 may be described as an AI network.

Figure 2:
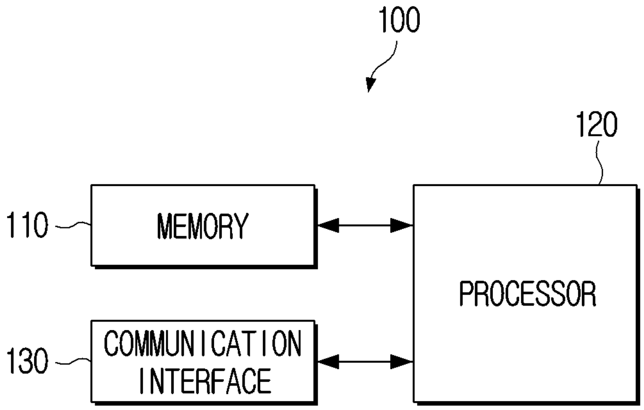
FIG. 2 is a block diagram illustrating an example electronic apparatus according to various embodiments.

FIG. 2 is a block diagram illustrating an example electronic apparatus 100 according to various embodiments.

Referring to FIG. 2, the electronic apparatus 100 may include at least one of a memory 110, at least one processor 120, or a communication interface 130.

The electronic apparatus 100 may include the memory 110 storing at least one instruction and the at least one processor 120 connected to the memory 110 to control the electronic apparatus 100.

The electronic apparatus 100 may be implemented as a variety of devices capable of processing voice signals, such as a smartphone, a tablet, a television, etc. The electronic apparatus 100 may be implemented as a server that processes voice signals.

The electronic apparatus 100 may be an electronic blackboard, a television, a desktop PC, a laptop, a smartphone, a tablet PC, a server, or the like. The examples described above are only to explain the electronic apparatus, and the electronic apparatus 100 is not limited to the devices described above.

The memory 110 may be implemented as an internal memory such as ROM (e.g., electrically erasable programmable read-only memory (EEPROM)) or RAM included in the at least one processor 120, or may be implemented as a memory that is separate from the at least one processor 120. In this case, the memory 110 may be implemented as a memory embedded in the electronic apparatus 100 or as a memory detachable from the electronic apparatus 100 depending on the data storage purpose. For example, in a case of data for driving the electronic apparatus 100, such data may be stored in the memory embedded in the electronic apparatus 100, and, in a case of data for an expansion function of the electronic apparatus 100, such data may be stored in a memory detachable from the electronic apparatus 100.

The at least one processor 120 may be implemented as a digital signal processor (DSP), a microprocessor, or a Time controller (TCON) that processes a digital image signal. However, the at least one processor 120 are not limited thereto, and may include one or more of a central processing unit (CPU), a Micro Controller Unit (MCU), a micro processing unit (MPU), a controller, an application processor (AP), graphics-processing unit (GPU) or a communication processor (CP), or an advanced reduced instruction set computer (RISC) machine (ARM) processor, or may be defined by the corresponding term. In addition, the at least one processor 120 may be implemented in a system-on-chip (SoC) or a large scale integration (LSI) in which a processing algorithm is embedded, or may be implemented in the form of a field programmable gate array (FPGA). The processor 120 may include various processing circuitry and/or multiple processors. For example, as used herein, including the claims, the term “processor” may include various processing circuitry, including at least one processor, wherein one or more of at least one processor, individually and/or collectively in a distributed manner, may be configured to perform various functions described herein. As used herein, when “a processor”, “at least one processor”, and “one or more processors” are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The at least one processor 120 may perform various functions by executing computer executable instructions stored in the memory.

The communication interface 130 is configured to perform communication with various types of external devices using various types of communication methods. The communication interface 130 may include a wireless communication module including wireless communication circuitry and/or a wired communication module including wired communication circuitry. Each communication module may be implemented in the form of at least one hardware chip.

The at least one processor 120 may perform overall control operations of the electronic apparatus 100. The at least one processor 120 functions to control the overall operations of the electronic apparatus 100.

In an embodiment, the at least one processor 120 may, by executing at least one instruction, obtain a first audio signal (s1) including a voice signal and a noise signal, convert the first audio signal (s1) in a time domain to a second audio signal (s2) in a frequency domain, obtain a first gain value (g1) representing a signal-to-noise ratio (SNR) from the second audio signal (s2), obtain a second gain value (g2) having a first dynamic range by filtering the first gain value (g1), obtain a third gain value (g3) by inputting the second gain value (g2) to a neural network model trained to output a denoised signal, and convert the second audio signal (s2) to a third audio signal (s3) having at least a portion of the noise signal removed using the third gain value (g3).

In an embodiment, the at least one processor 120 may back-convert the third audio signal (s3) in a frequency domain to a fourth audio signal (s4) in a time domain.

In an embodiment, the at least one processor 120 may obtain the first audio signal (s1).

According to various embodiments, the at least one processor 120 may obtain the first audio signal (s1) via a microphone included in the electronic apparatus 100.

According to various embodiments, the at least one processor 120 may obtain the first audio signal (s1) from an external device 200. The electronic apparatus 100 may further include a communication interface 130 connected to the external device, and the at least one processor 120 may obtain the first audio signal (s1) from the external device via the communication interface 130. An example embodiment in this regard is described with reference to FIG. 15.

In an embodiment, the at least one processor 120 may receive the first audio signal (s1) as input data. The at least one processor 120 may obtain a fourth audio signal (s4) as output data by inputting the at least one audio signal (s1) to an AI model 1. The AI model 1 may include at least one of a first module 10, a second module 20, a third module 30, a fourth module 40, a fifth module 50, or a sixth module 60. These will be described with reference to FIG. 3.

In an embodiment, the first audio signal (s1) may be a signal in a time domain. The at least one processor 120 may, via the first module 10, convert the first audio signal (s1) in the time domain to a second audio signal (s2) in a frequency domain. The at least one processor 120 may obtain the second audio signal (s2) corresponding to the first audio signal (s1) via the first module 10.

In an embodiment, the at least one processor 120 may convert the first audio signal (s1) to the second audio signal (s2) using Short-Time Fourier Transform (STFT).

In an embodiment, the first module 10 may be a module that converts an audio signal in a time domain to an audio signal in a frequency domain using STFT.

In an embodiment, the at least one processor 120 may obtain the first gain value (g1) based on the second audio signal (s2). The at least one processor 120 may obtain the first gain value (g1) from the second audio signal (s2) via the second module 20.

In an embodiment, the first gain value (g1) may be a vector of the same dimension as the number of sub-bands of the first audio signal (s1). The first gain value (g1) may be a gain vector for the second audio signal.

In an embodiment, the second module 20 may represent a speech enhancement (SE) module. The first gain value (g1) may be a value representing a voice signal and a noise signal included in the second audio signal (s2). The first gain value (g1) may be a value representing the degree of inclusion of the voice signal and the noise signal in the audio signal. For example, the first gain value (g1) may represent a value associated with a signal-to-noise ratio (SNR).

In an embodiment, the at least one processor 120 may convert (or filter) the first gain value (g1) to the second gain value (g2) via the third module 30. The third module 30 may be a module that compresses (or filters) the gain value. The third module 30 may include a Gain Compression (GC) module. The third module 30 may filter the gain value based on a preset dynamic range.

In an embodiment, the second gain value (g2) obtained by the third module 30 may be the result of performing a normalization on the first gain value (g1). The filtering operation may be described as a normalization operation. The at least one processor 120 may convert the first gain value (g1) to the second gain value (g2) based on preset parameters. For example, the first gain value (g1) may have a value in the range of 0.0001 to 1.0 (logarithmic scale). The second gain value (g2) may be on a linear scale.

In an embodiment, the at least one processor 120 may, via the second module 20, obtain at least one of a first noise value (N1), a first posteriori signal-to-noise ratio (ISNR1), or a first priori signal-to-noise ratio (OSNR1) based on the second audio signal (s2).

In an embodiment, the at least one processor 120 may, via the second module 20, obtain the first gain value (g1) based on at least one of a first noise value (N1), a first posteriori signal-to-noise ratio (ISNR1), or a first priori signal-to-noise ratio (OSNR1).

In an embodiment, the at least one processor 120 may, via a first evaluation module 21, obtain the first noise value (N1) from the second audio signal (s2) based on a first parameter (P_NE) stored in the memory 110.

In an embodiment, the at least one processor 120 may, via a second evaluation module 22, obtain the first posterior signal-to-noise ratio (ISNR1) from the second audio signal (s2) and/or the first noise value based on a second parameter (P_ISNR) stored in the memory 110.

In an embodiment, the at least one processor 120 may, via a third evaluation module 23, obtain the first priori signal-to-noise ratio (OSNR1) from the second audio signal (s2) and/or the first posteriori signal-to-noise ratio (ISNR1) based on a third parameter (P_OSNR) stored in the memory 110.

In an embodiment, the at least one processor 120 may, via a fourth evaluation module 24, obtain the first gain value (g1) from the second audio signal (s2) and/or the first priori signal-to-noise ratio (OSNR1) based on a fourth parameter (P_GE) stored in the memory 110. The evaluation modules will be described in detail with reference to FIG. 5.

In an embodiment, the at least one processor 120 may, via the third module 30, compress (or filter) at least one of the first noise value (N1), the first posterior signal-to-noise ratio (ISNR1), or the first priori signal-to-noise ratio (OSNR1).

In an embodiment, the at least one processor 120 may, via a first compression module 31, obtain a second gain value (g2) having a first dynamic range by filtering the first gain value (g1). The second gain value (g2) may be included in the first dynamic range.

In an embodiment, the at least one processor 120 may, via a second compression module 32, obtain a second noise value (N2) having a second dynamic range by filtering the first noise value (N1). The second noise value (N2) may be included in the second dynamic range.

In an embodiment, the at least one processor 120 may, via a third compression module 33, obtain a second posterior signal-to-noise ratio (ISNR2) having a third dynamic range by filtering the first posterior signal-to-noise ratio (ISNR1). The second posterior signal-to-noise ratio (ISNR2) may be included in the third dynamic range.

In an embodiment, the at least one processor 120 may, via a fourth compression module 34, obtain a second priori signal-to-noise ratio (OSNR2) having a fourth dynamic range by filtering the first priori signal-to-noise ratio (OSNR1). The second priori signal-to-noise ratio (OSNR2) may be included in the fourth dynamic range.

In an embodiment, each of the first dynamic range, second dynamic range, third dynamic range, and fourth dynamic range may be different for each of the compression modules.

The compression modules will be described in detail with reference to FIG. 6.

In an embodiment, the at least one processor 120 may obtain the third gain value (g3) by inputting the second gain value (g2), the second noise value (N2), the second posterior signal-to-noise ratio (ISNR2), and the second priori signal-to-noise ratio (OSNR2) to a trained neural network model.

In an embodiment, the trained neural network model may include the fourth module 40. The fourth module 40 may include a deep neural network (DNN) module. The fourth module 40 may be a pre-trained model. The fourth module 40 may be a module that outputs a denoised signal. The fourth module 40 may be a module trained to remove as much noise as possible from input data. The learning operation of the fourth module 40 will be described with reference to FIG. 7.

In an embodiment, the at least one processor 120 may input the second gain value (g2), the second noise value (N2), the second posteriori signal-to-noise ratio (ISNR2), and the second priori signal-to-noise ratio (OSNR2) obtained via the third module 30 to the fourth module 40.

In an embodiment, the at least one processor 120 may, via the fourth module 40, obtain the third gain value (g3). The at least one processor 120 may obtain the third module 30 based on at least one of the second gain value (g2), the second noise value (N2), the second posteriori signal-to-noise ratio (ISNR2), or the second priori signal-to-noise ratio (OSNR2).

In an embodiment, the at least one processor 120 may identify a noise component corresponding to the second audio signal (s2) based on the third gain value (g3). The third gain value (g3) may be a value representing information regarding a voice signal and information regarding a noise signal. The at least one processor 120 may identify (or extract) a noise component (or a noise element) included in the second audio signal (s2) based on the third gain value (g3).

In an embodiment, the at least one processor 120 may, via the fifth module 50, convert the second audio signal (s2) to the third audio signal (s3) by removing the noise component from the second audio signal (s2). The at least one processor 120 may obtain the third audio signal (s3) by removing the noise component from the second audio signal (s2). The fifth module 50 may include a signal processing (SP) module. The at least one processor 120 may perform a signal processing operation via the fifth module 50, and obtain the third audio signal (s3) with the noise component removed.

According to various embodiments, the at least one processor 120 may further use a reverse noise signal in obtaining the third audio signal (s3).

In an embodiment, the at least one processor 120 may identify a noise signal based on the first audio signal (s1).

In an embodiment, the at least one processor 120 may generate a reverse noise signal based on the noise signal.

In an embodiment, the at least one processor 120 may obtain a first filtering signal by combining the first audio signal (s1) and the reverse noise signal.

In an embodiment, the at least one processor 120 may convert the second audio signal (s2) to the third audio signal (s3) based on the first filtering signal and the third gain value (g3). The above will be described in detail with reference to FIG. 13.

A gain value may be described as a vector, a feature vector, a vector of a specific dimension, etc.

Figure 3:
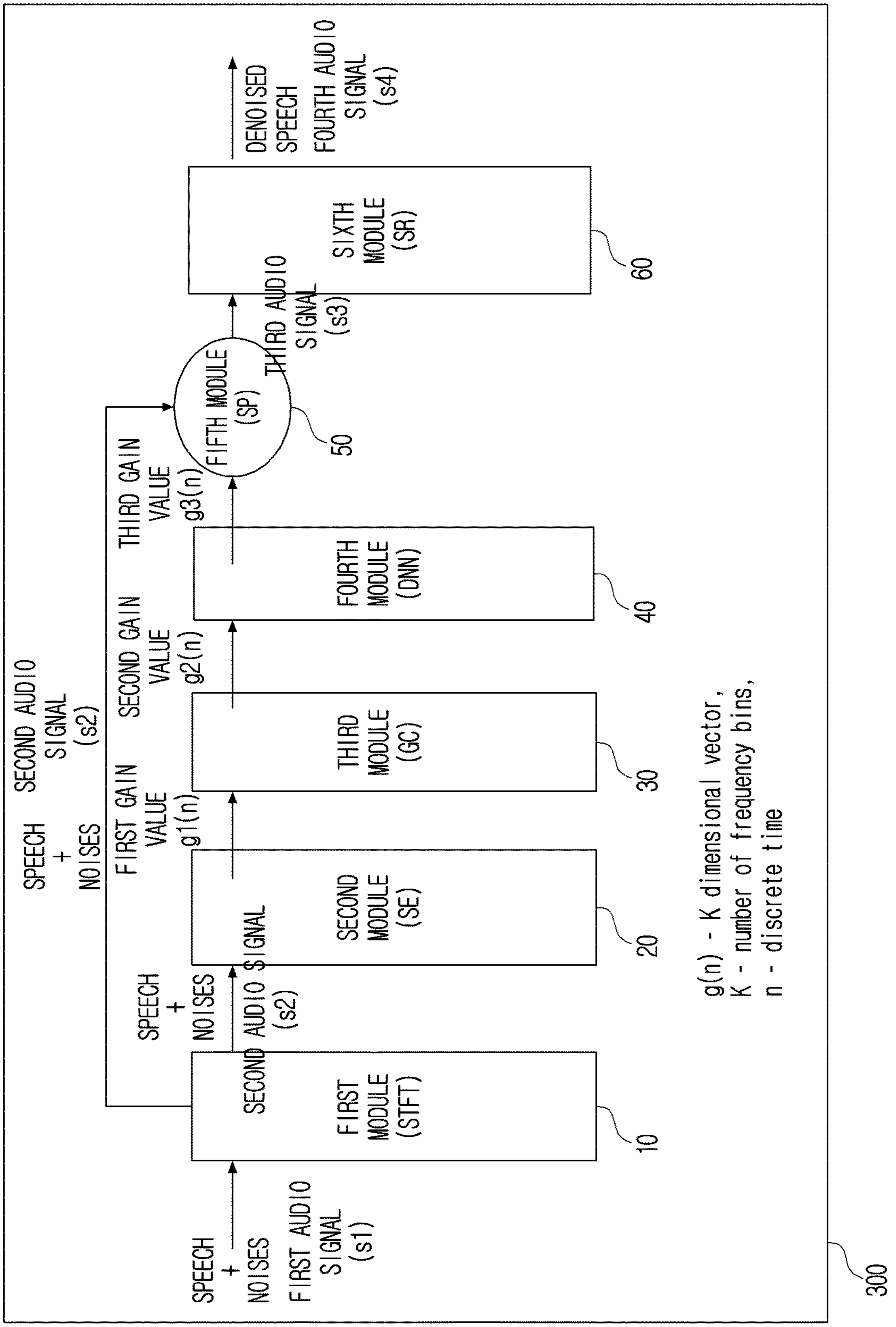
FIG. 3 is a view provided to explain at least one module used for an example noise cancellation operation according to various embodiments.

FIG. 3 illustrates at least one example module used for a noise cancellation operation according to various embodiments.

Referring to the example 300 of FIG. 3, the electronic apparatus 100 may include at least one of the first module 10, the second module 20, the third module 30, the fourth module 40, the fifth module 50, or the sixth module 60.

The electronic apparatus 100 may obtain the first audio signal (s1). The first audio signal (s1) may include a voice (speech) signal and a noise signal. The first audio signal (s1) may be a combined (or mixed) signal of the voice signal and the noise signal.

The electronic apparatus 100 may input (or transmit) the first audio signal (s1) to the first module 10. The first module 10 may be, for example, a module that performs Short-Time Fourier Transform (STFT). The first module 10 may be described herein as, for example, an STFT module, a conversion module, a preprocessing module, or the like.

When the first audio signal (s1) is received, the first module 10 may convert the first audio signal (s1) to a second audio signal (s2). The first module 10 may obtain the second audio signal (s2) corresponding to the first audio signal (s1) as output data.

The first audio signal (s1) may be a signal in a time domain, and the second audio signal (s2) may be a signal in a frequency domain. The second audio signal (s2) may be a signal representing a change in frequency over time. The second audio signal (s2) may be described, for example, as a time-frequency spectrum.

The first module 10 may transmit (or output) the second audio signal (s2) to the second module 20. The first module 10 may transmit (or output) the second audio signal (s2) to the fifth module 50.

The second module 20 may receive the second audio signal (s2) from the first module 10. The second module 20 may be, for example, a module that performs a speech enhancement operation. The second module 20 may be described as a Speech Enhancement (SE) module. The second module 20 may be described, for example, as an audio analysis module, an audio evaluation module, or the like.

When the second audio signal (s2) is received, the second module 20 may obtain a first gain value (g1) corresponding to the second audio signal (s2). The first gain value (g1) may be, for example, a value representing a voice signal and a noise signal included in the second audio signal (s2). The first gain value (g1) may be a value representing the degree of inclusion of the voice signal and the noise signal in the audio signal. For example, the first gain value (g1) may represent a value associated with a signal-to-noise ratio (SNR).

The second module 20 may transmit (or output) the first gain value (g1) to the third module 30.

The third module 30 may receive the first gain value (g1) from the second module 20. The third module 30 may, for example, be a module that filters (or compresses) a gain value. The third module 30 may filter the first gain value (g1) according to a preset dynamic range. The third module 30 may be described, for example, as a Gain Compression (GC) module.

The preset dynamic range may be described as a preset range, a preset gain range, etc. The preset dynamic range may be changed by user settings or through a learning process of an artificial intelligence model. The third module 30 may be described, for example, as a compression module, a filtering module, or the like.

Once the first gain value (g1) is received, the third module 30 may obtain the second gain value (g2) by filtering the first gain value (g1).

The third module 30 may transmit (or output) the second gain value (g2) to the fourth module 40.

The fourth module 40 may receive the second gain value (g2) from the third module 30. The fourth module 40 may be, for example, a module that performs signal processing associated with noise. The fourth module 40 may include a deep neural network (DNN) module. The fourth module 40 may be a pre-trained model. The fourth module 40 may be a module that outputs a denoised signal. The fourth module 40 may be, for example, a module trained to remove as much noise as possible from the input data, although the disclosure is not limited in this respect.

Once the second gain value (g2) is received, the fourth module 40 may obtain the third gain value (g3) based on the second gain value (g2). The third gain value (g3) may be a value representing a signal from which noise is removed as much as possible from the audio signal. The third gain value (g3) may represent, for example, at least one of a voice signal, a noise signal, a proportion of the voice signal of the total signal, a proportion of the noise signal of the total signal, and a proportion of the voice signal relative to the noise signal.

The third module 30 may transmit (or output) the third gain value (g3) to the fifth module 50.

The fifth module 50 may receive the third gain value (g3) from the third module 30. The fifth module 50 may receive the second audio signal (s2) from the first module 10. The fifth module 50 may be, for example, a module that outputs the third audio signal from which the noise signal is removed. The third audio signal (s3) may be, for example, a signal in the frequency domain. The fifth module 50 may be described as a multiplication module, a computation module, a synthesis module, a denoising module, or the like. The fifth module 50 may perform an operation to remove a noise signal from the second audio signal (s2) using the third gain value (g3).

The fifth module 50 may include a signal processing (SP) module.

When at least one of the third gain value (g3) or the second audio signal (s2) is received, the fifth module 50 may obtain the third audio signal (s3) based on at least one of the third gain value (g3) or the second audio signal (s2). The third module 30 may obtain the third audio signal (s3) from which the noise signal is removed.

The fifth module 50 may transmit (or output) the third audio signal (s3) to the sixth module 60.

The sixth module 60 may receive the third audio signal (s3) from the fifth module 50. The sixth module 60 may be a module that reversely converts (or transforms) a signal in the frequency domain to a signal in the time domain. The sixth module 60 may be described as a reverse conversion module, a post-processing module, or the like. The sixth module 60 may include a Spectral Representation (SR) module.

When the third audio signal (s3) is received, the sixth module 60 may obtain (or convert) a fourth audio signal (s4) corresponding to the third audio signal (s3). The third audio signal (s3) may be a signal in the frequency domain, and the fourth audio signal (s4) may be a signal in the time domain. The fourth audio signal (s4) may be a signal in a format that is ultimately provided to the user. The fourth audio signal (s4) may be a denoised signal.

According to various embodiments, the third module 30 may be omitted. The first gain value (g1) obtained in the second module 20 may be transmitted directly to the fourth module 40. The fourth module 40 may obtain the third gain value (g3) based on the first gain value (g1).

Figure 4:
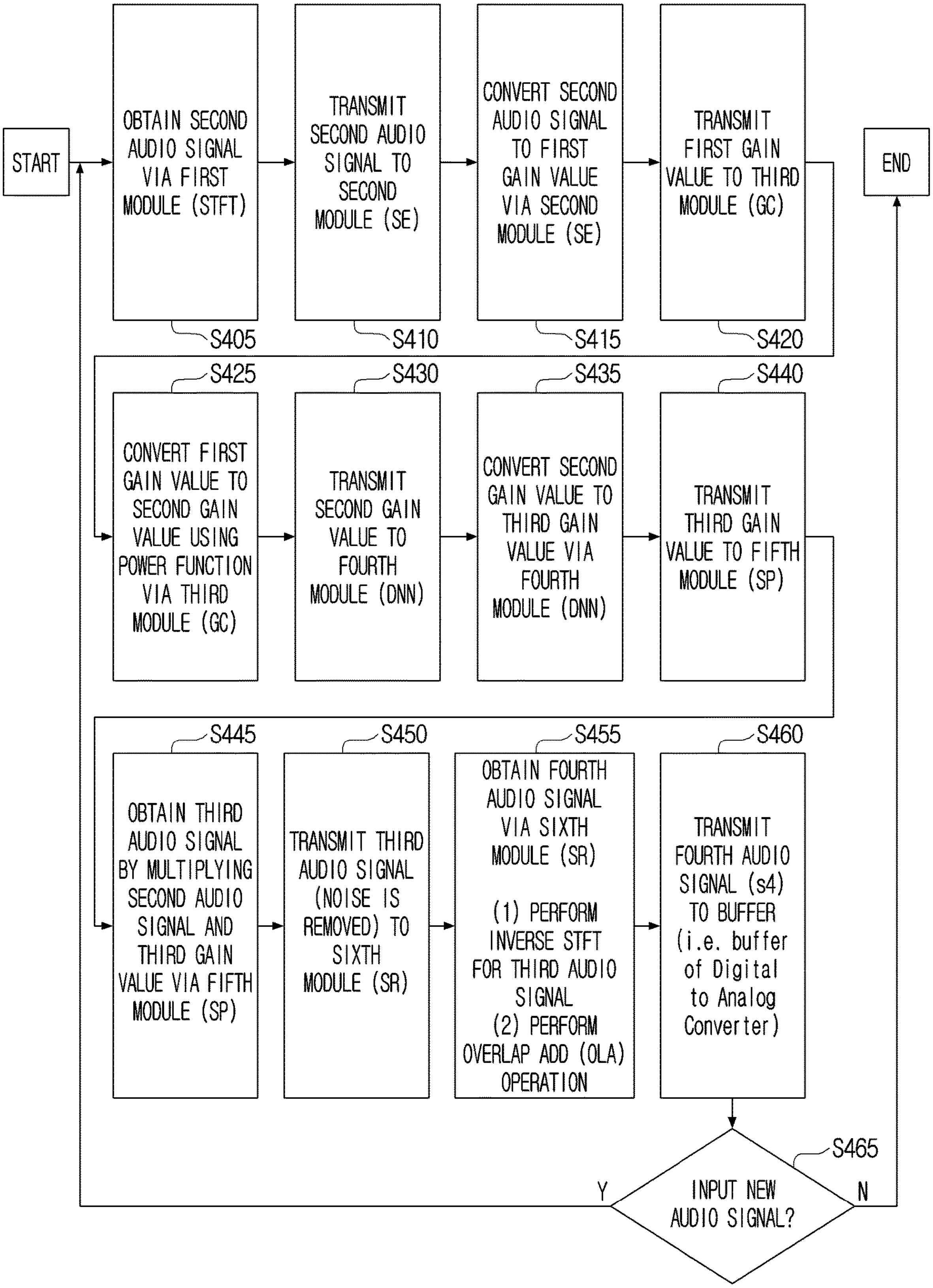
FIG. 4 is a flowchart illustrating an example noise cancellation operation according to various embodiments.

FIG. 4 is a flowchart illustrating an example noise cancellation operation according to an embodiment.

Referring to FIG. 4, the electronic apparatus 100 may obtain the second audio signal (s2) via the first module 10 (S405).

The electronic apparatus 100 may transmit (or output) the second audio signal (s2) to the second module 20 (S410).

The electronic apparatus 100 may convert the second audio signal (s2) to the first gain value (g1) via the second module 20 (S415).

The electronic apparatus 100 may transmit (or output) the first gain value (g1) to the third module 30 (S420).

The electronic apparatus 100 may convert the first gain value (g1) to the second gain value (g2) using a power function via the third module 30 (S425).

The electronic apparatus 100 may transmit (or output) the second gain value (g2) to the fourth module 40 (S430).

The electronic apparatus 100 may convert the second gain value (g2) to the third gain value (g3) via the fourth module 40 (S435).

The electronic apparatus 100 may transmit (or output) the third gain value (g3) to the fifth module 50 (S440).

The electronic apparatus 100 may obtain the third audio signal (s3) by multiplying the second audio signal (s2) and the third gain value (g3) via the fifth module 50 (S445).

The electronic apparatus 100 may transmit (or output) the third audio signal (s3) to the sixth module 60 (S450). The third audio signal (s3) may be a signal in a denoised frequency domain.

The electronic apparatus 100 may obtain the fourth audio signal (s4) via the sixth module 60 (S455). The electronic apparatus 100 may perform inverse STFT on the third audio signal (s3) via the sixth module 60. The sixth module 60 may perform an OVERLAP ADD (OLA) operation. The OLA operation may be an operation that performs a process of overlapping and adding audio signals. The sixth module 60 may obtain the fourth audio signal (s4) corresponding to the third audio signal (s3).

The electronic apparatus 100 may transmit (or output) the fourth audio signal (s4) to a buffer (S460). The electronic apparatus 100 may store the fourth audio signal (s4) in the buffer. The buffer may represent, for example, a converter that converts a digital signal to an analog signal.

The electronic apparatus 100 may determine whether a new audio signal is received (S465). If a new audio signal is received (S465-Y), the electronic apparatus 100 may repeat steps S405 through S466. If the new audio signal is not received (S465-N), the electronic apparatus 100 may provide the fourth audio signal (s4) stored in the buffer to the user.

Figure 5:
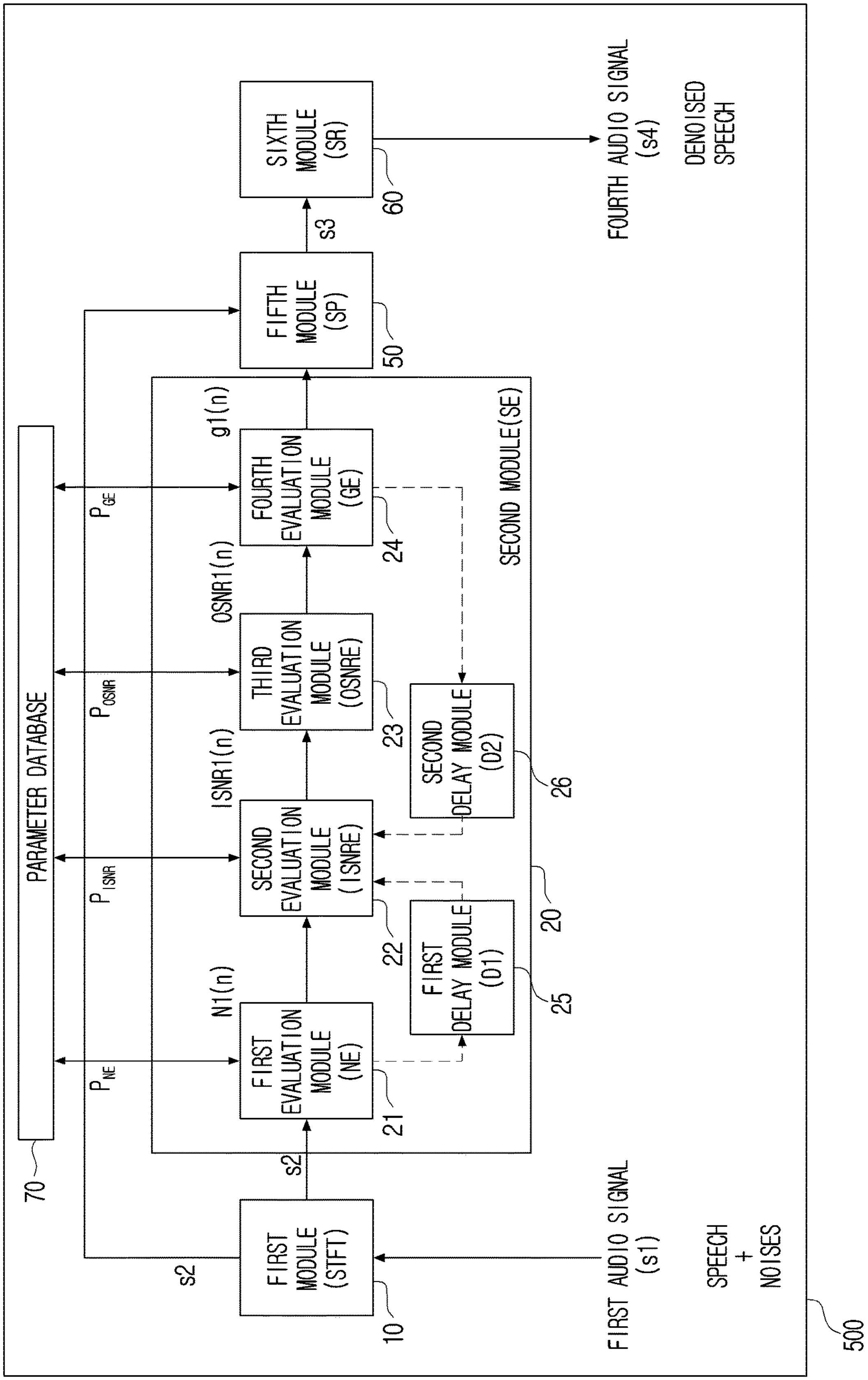
FIG. 5 is a view illustrating an example process of obtaining a gain value according to various embodiments.

FIG. 5 is a view illustrating an example process of obtaining a gain value according to various embodiments.

Referring to the example 500 of FIG. 5, the electronic apparatus 100 may include at least one of the first module 10, the fifth module 50, the sixth module 60, or parameter database 70.

The electronic apparatus 100 may input the first audio signal (s1) to the first module 10. Upon receiving the first audio signal (s1), the first module 10 may convert the first audio signal (s1) to the second audio signal (s2). The electronic apparatus 100 may transmit (or output) the second audio signal (s2) to the second module 20.

The second module 20 may include at least one of a first evaluation module 21, the second evaluation module 22, the third evaluation module 23, the fourth evaluation module 24, a first delay module 25, or a second delay module 26. According to various embodiments, operations performed in the first delay module 25 and the second delay module 26 may be omitted.

The first evaluation module 21 may be a module that evaluates (or extracts) noise. The first evaluation module 21 may include a Noise Estimation (NE) module. The first evaluation module 21 may be described, for example, as a noise evaluation module. The first evaluation module 21 may receive the second audio signal (s2).

The second module 20 or each evaluation module may request parameters from the parameter database 70. The parameter database 70 may transmit the parameters to the second module 20 or each evaluation module in response to the request.

The first evaluation module 21 may receive the noise evaluation parameter (P_NE) from the parameter database 70. The first evaluation module 21 may obtain the first noise value (N1) value based on the second audio signal (s2) and the noise evaluation parameter (P_NE). The noise evaluation parameter (P_NE) may be described, for example, as a first parameter. The first evaluation module 21 may transmit (or output) the first noise value (N1) to the second evaluation module 22.

The first evaluation module 21 may delay one frame (audio signal separated by a preset unit) via the first delay module 25 and transmit the same to the second evaluation module 22.

The second evaluation module 22 may obtain the first noise value (N1) from the first evaluation module 21. The second evaluation module 22 may receive the delayed one frame from the first delay module 25. The delayed one frame may refer to, for example, a frame corresponding to a delayed time, other than the time at which the first noise value (N1) is obtained, from among a plurality of frames included in the audio signal. The frames may include units that separate the audio signal.

For example, if a 10-second audio signal is divided by 1 second units, the audio signal may be divided into 10 frames. A first frame may include an audio signal between 0 and 1 second. A second frame may include an audio signal between 1 second and 2 seconds; etc.

If a noise value between 1 second and 2 seconds is received by the second evaluation module 22, the second evaluation module 22 may receive a first frame between 0 second and 1 second from the first delay module 25.

The second evaluation module 22 may receive a parameter (P_ISNR) of a posteriori signal-to-noise ratio (ISNR) from the parameter database 70. The parameter (P_ISNR) of the posteriori signal-to-noise ratio (ISNR) may be described, for example, as a second parameter.

The second evaluation module 22 may obtain a posterior signal-to-noise ratio (ISNR) based on the first noise value (N1) and the parameter (P_ISNR). The posterior signal-to-noise ratio (ISNR) may represent the ratio between the voice signal and the noise signal after removing noise from the audio signal. The second evaluation module 22 may include a posteriori SNR Estimation (ISNRE) module. The higher the value of the posteriori SNR, the greater the denoising effectiveness may be evaluated.

The post-processed signal-to-noise ratio (ISNR) may be described, for example, as a first signal-to-noise ratio, a first SNR, a post-processed SNR, etc.

In an embodiment, the second evaluation module 22 may obtain a posterior signal-to-noise ratio (ISNR) based on the first noise value (N1), the parameter (P_ISNR), and the delayed frame.

In an embodiment, the second evaluation module 22 may transmit (or output) the posterior signal-to-noise ratio (ISNR) to the third evaluation module 23.

The third evaluation module 23 may receive a parameter (P_OSNR) a priori signal-to-noise ratio (OSNR, a priori SNR) from the parameter database 70. The parameter (P_OSNR) of the priori signal-to-noise ratio (OSNR) may be described, for example, as a third parameter.

In an embodiment, the third evaluation module 23 may obtain a posteriori signal-to-noise ratio (ISNR) from the second evaluation module 22. The third evaluation module 23 may obtain a priori signal-to-noise ratio (OSNR) based on the posteriori ISNR and the parameter (P_OSNR). The priori signal-to-noise ratio (OSNR) may represent a ratio between the voice signal and the noise signal before the noise is removed from the audio signal. The third evaluation module 23 may include a priori SNR Estimation (OSNRE) module. The higher the value of the priori SNR, the weaker the noise may be evaluated.

In an embodiment, the third evaluation module 23 may transmit (or output) the priori signal-to-noise ratio (OSNR) to the fourth evaluation module 24.

The fourth evaluation module 24 may receive the priori signal-to-noise ratio (OSNR) from the third evaluation module 23. The fourth evaluation module 24 may receive a gain evaluation parameter (P_GE) from the parameter database 70.

The fourth evaluation module 24 may obtain a gain value (G) based on the priori signal-to-noise ratio (OSNR) and the gain evaluation parameter (P_GE). The gain value (G) may be a value representing a denoised audio signal. The gain value may include a plurality of values. The gain value (G) may be described, for example, as gain information. The fourth evaluation module 24 may include a Gain Estimation (GE) module.

The fourth evaluation module 24 may transmit (or output) the gain value (G) to the fifth module 50.

In an embodiment, the fourth evaluation module 24 may transmit one delayed frame to the second evaluation module 22 via the second delay module 26.

In an embodiment, the second evaluation module 22 may receive a first delay frame from the first evaluation module 21 and may receive a second delay frame from the fourth evaluation module 24. The first delay frame may be transmitted to the second evaluation module 25 via the first delay module 25. The second delay frame may be transmitted to the second evaluation module 25 via the second delay module 26.

According to various embodiments, the time range corresponding to the first delay frame and the time range corresponding to the second delay frame may be the same.

According to various embodiments, the time range corresponding to the first delay frame and the time range corresponding to the second delay frame may be different.

In an embodiment, the second evaluation module 22 may obtain a posterior signal-to-noise ratio (ISNR) based on at least one of the first delay frame, the second delay frame, the first noise value (N1), or the parameter (P_ISNR).

The fifth module 50 may receive the gain value (G) from the fourth evaluation module 24 or the second module 20. The fifth module 50 may receive the second audio signal (s2) from the first module 10. The fifth module 50 may obtain the third audio signal (s3) based on at least one of the gain value (G) or the second audio signal (s2). The fifth module 50 may transmit (or output) the third audio signal (s3) to the sixth module 60.

The sixth module 60 may receive the third audio signal (s3) from the fifth module 50. The sixth module 60 may obtain the fourth audio signal (s4) corresponding to the third audio signal (s3).

According to various embodiments, the electronic apparatus 100 may further include the third module 30, the fourth module 40, and the like. The third module 30 may receive the gain value (G) output from the second module 20. The gain value (G) may be the first gain value (g1) of FIG. 3. The third module 30 may obtain the second gain value (g2) based on the first gain value (g1). The third module 30 may transmit (or output) the second gain value (g2) to the fourth module 40. The fourth module 40 may obtain the third gain value (g3) based on the second gain value (g2). The fourth module 40 may transmit (or output) the third gain value (g3) to the fifth module 50.

According to various embodiments, the electronic apparatus 100 may transmit the second audio signal (s2) to the detailed modules 21, 22, 23, 24, 25, and 26 included in the second module 20. Although not explicitly shown in FIG. 5, the second audio signal (s2) may be transmitted to and stored in each module.

In FIG. 5, the first delay module 25 and the second delay module 26 delay one frame. According to various embodiments, the first delay module 25 and the second delay module 26 may perform an operation of transmitting previous values used in the algorithm. For example, the second evaluation module 22 may use the noise value (N_n−1) at time n−1 and the first gain value (g1) at time n−1 in performing the computation operation at time n. The second evaluation module 22 may receive the noise value (N_n−1) at time n−1 via the first evaluation module 21 and the first delay module 25. The second evaluation module 22 may receive the first gain value (g1) at time n−1 via the fourth evaluation module 24 and the second delay module 26.

Figure 6:
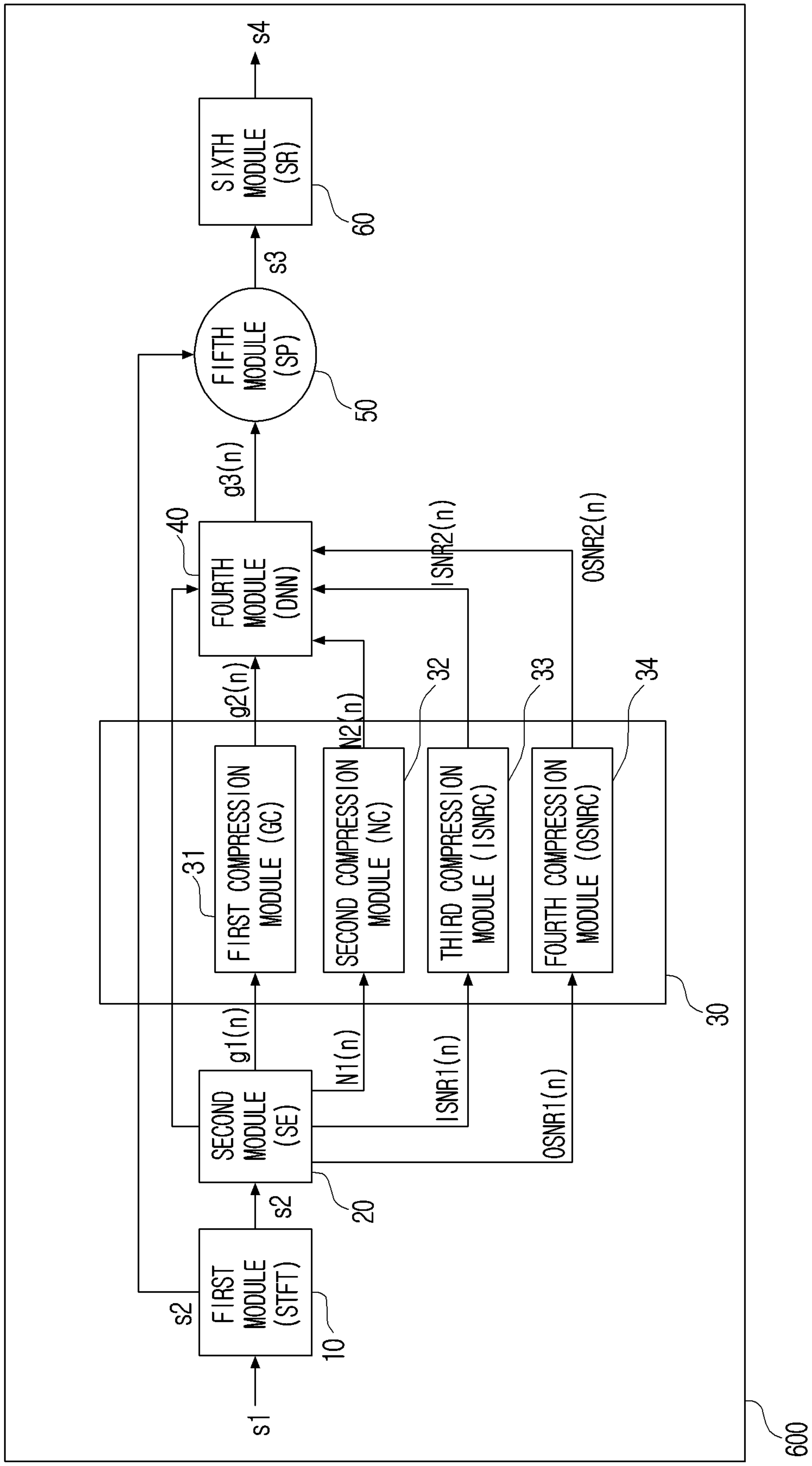
FIG. 6 is a view illustrating an example operation of obtaining a third gain value according to various embodiments.

FIG. 6 illustrates an example operation of obtaining a third gain value according to various embodiments.

Referring to the example 600 of FIG. 6, the electronic apparatus 100 may include at least one of the first module 10, the second module 20, the third module 30, the fourth module 40, the fifth module 50, or the sixth module 60.

The electronic apparatus 100 may input the first audio signal (s1) to the first module 10. The first module 10 may obtain the second audio signal (s2) corresponding to the first audio signal (s1). The first module 10 may transmit (or output) the second audio signal (s2) to the second module 20.

The second module 20 may obtain at least one of the first gain value (g1), the first noise value (N1), a first posteriori signal-to-noise ratio ISNR1, or a first priori signal-to-noise ratio OSNR1 based on the second audio signal (s2).

The second module 20 may transmit (or output) at least one of the first gain value (g1), the first noise value (N1), the first posteriori signal-to-noise ratio (ISNR1), or the first priori signal-to-noise ratio (OSNR1) to the third module 30.

The third module 30 may include at least one of the first compression module 31, the second compression module 32, the third compression module 33, or the fourth compression module 34.

The second module 20 may transmit (or output) the first gain value (g1) to the first compression module 31.

The second module 20 may transmit (or output) the first noise value (N1) to the second compression module 32.

The second module 20 may transmit (or output) the first posterior signal-to-noise ratio (ISNR1) to the third compression module 33.

The second module 20 may transmit (or output) the first priori signal-to-noise ratio (OSNR1) to the fourth compression module 34.

The first compression module 31 may obtain the first gain value (g1) from the second module 20. The first compression module 31 may filter (or convert) the first gain value (g1) to the second gain value (g2) based on a first dynamic range. The first dynamic range may be changed based on user settings. The first compression module 31 may transmit (or output) the second gain value (g2) to the fourth module 40.

The second compression module 32 may obtain the first noise value (N1) from the second module 20. The second compression module 32 may filter (or convert) the first noise value (N1) to the second noise value (N2) based on a second dynamic range. The second dynamic range may be changed based on user settings. The second compression module 32 may transmit (or output) the second noise value (N2) to the fourth module 40.

The third compression module 33 may obtain the first posterior signal-to-noise ratio (ISNR1) from the second module 20. The third compression module 33 may filter (or convert) the first posterior signal-to-noise ratio ISNR1 to the second posterior signal-to-noise ratio ISNR2 based on a third dynamic range. The third dynamic range may be changed based on user settings. The third compression module 33 may transmit (or output) the second posterior signal-to-noise ratio (ISNR2) to the fourth module 40.

The fourth compression module 34 may obtain the first priori signal-to-noise ratio (OSNR1) from the second module 20. The fourth compression module 34 may filter (or convert) the first priori signal-to-noise ratio (OSNR1) to the second priori signal-to-noise ratio (OSNR2) based on a fourth dynamic range. The fourth dynamic range may be changed based on user settings. The fourth compression module 34 may transmit (or output) the second priori signal-to-noise ratio (OSNR2) to the fourth module 40.

The fourth module 40 may receive the second gain value (g2), the second noise value (N2), the second posteriori signal-to-noise ratio ISNR2, and the second priori signal-to-noise ratio OSNR2 from each of the compression modules included in the third module 30.

The fourth module 40 may obtain the third gain value (g3) based on at least one of the second gain value (g2), the second noise value (N2), the second posteriori signal-to-noise ratio (ISNR2), or the second priori signal-to-noise ratio (OSNR2). The third gain value (g3) may be a gain value representing, for example, the signal after the noise signal is removed. The third gain value (g3) may be a gain value that is closest to an actual value.

The fourth module 40 may transmit (or output) the third gain value (g3) to the fifth module 50. The fifth module 50 may receive the second audio signal (s2) from the first module 10. The fifth module 50 may receive the third gain value (g3) from the fourth module 40. The fifth module 50 may obtain the third audio signal (s3) based on the third gain value (g3) and the second audio signal (s2).

The fifth module 50 may transmit (or output) the third audio signal (s3) to the sixth module 60. The sixth module 60 may obtain the fourth audio signal (s4) corresponding to the third audio signal (s3).

Figure 7:
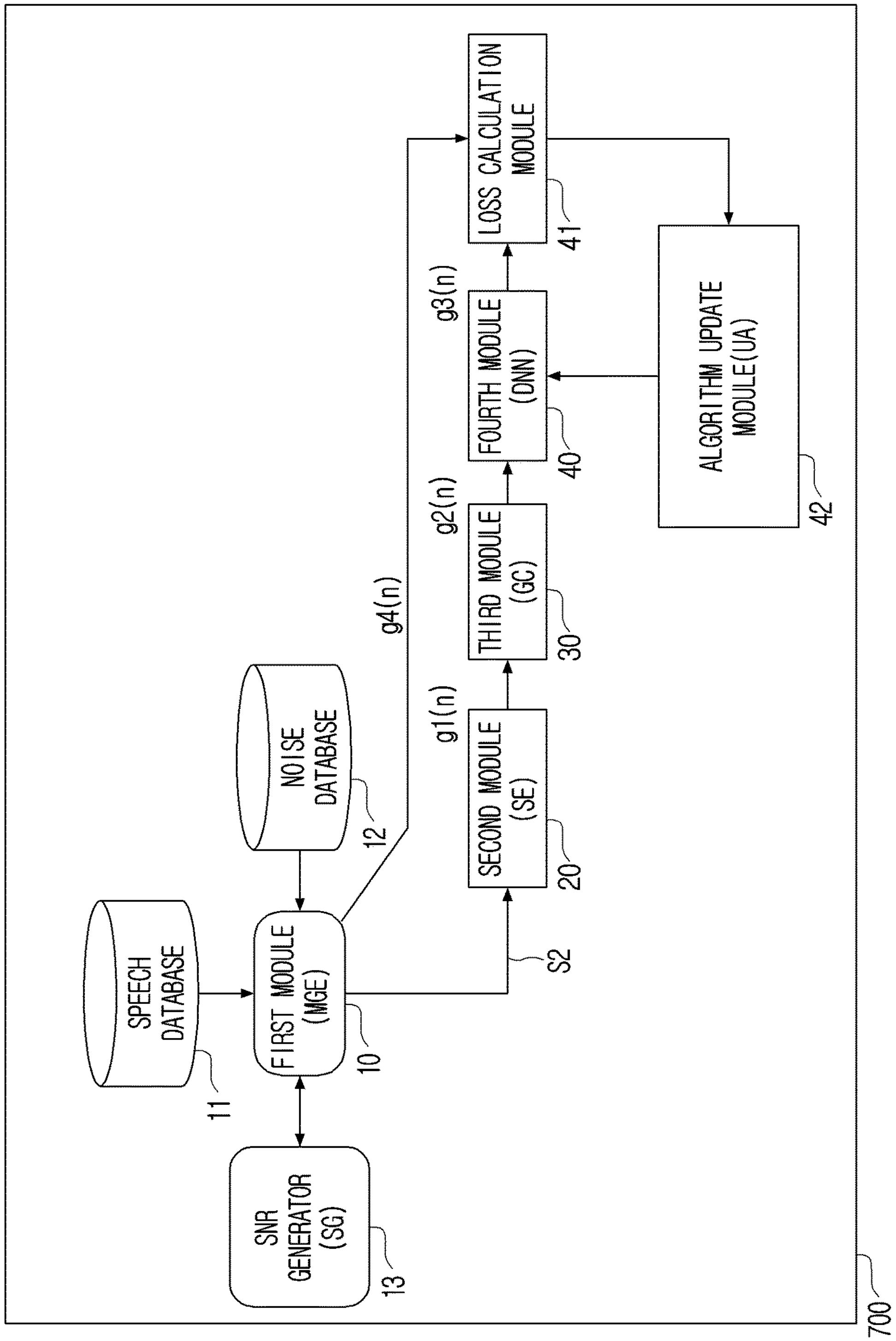
FIG. 7 is a flowchart illustrating an example learning process of a fourth module according to various embodiments.

FIG. 7 is a flowchart illustrating an example learning process of a fourth module according to various embodiments.

Referring to the example 700 of FIG. 7, the electronic apparatus 100 may include at least one of the first module 10, the second module 20, the third module 30, or the fourth module 40.

The electronic apparatus 100 may further include a speech database 11, a noise database 12, an SNR generator 13, a loss calculation module 41, and an algorithm update module 42.

The speech database 11 may, for example, store a plurality of sample voice signals.

The noise database 12 may, for example, store a plurality of sample noise signals.

According to various embodiments, the speech database 11, the noise database 12, and the SNR generator 13 may be included in the first module 10.

According to various embodiments, the loss calculation module 41, the algorithm update module 42 may be included in the fourth module 40.

The first module 10 may include a Mixing and Ground truth gains Estimation (MGE) module.

The first module 10 may obtain a sample voice signal from among the plurality of sample voice signals in the speech database 11. The first module 10 may obtain a sample noise signal from among the plurality of sample noise signals in the noise database 12.

The first module 10 may transmit the sample voice signal and the sample noise signal to the SNR generator 13. The SNR generator 13 may generate a sample SNR based on the sample voice signal and the sample noise signal. The SNR generator 13 may transmit the sample SNR to the first module 10. The SNR generator 13 may generate the sample SNR within a preset range. For example, the preset range may include −10 dB to 15 dB.

The first module 10 may generate the second audio signal (s2) by synthesizing the sample voice signal and the sample noise signal. Since it is a signal used in a learning process, the second audio signal (s2) may be described as a sample audio signal.

The first module 10 may include an MGE module. The MGE module may adjust the level of the noise signal. The MGE module may adjust the level of the sample voice signal. The MGE module may combine the adjusted noise signal and the adjusted sample voice signal. The MGE module may obtain the fourth gain value (g4) using a preset attenuation law. The fourth gain value (g4) may, for example, be a value generated based on the sample SNR, the adjusted noise signal, and the adjusted sample voice signal. The preset attenuation law may be a Wiener filter. However, the disclosure is not limited in this respect.

The fourth gain value (g4) may be an actual value. The actual value may represent a denoised voice signal. The first module 10 may transmit the fourth gain value (g4) obtained from the MGE module to the loss calculation module 41.

The fourth gain value (g4) may be obtained based on the voice signal and the noise signal. The electronic apparatus 100 may obtain the second audio signal (s2) including the voice signal and the noise signal.

According to various embodiments, the electronic apparatus 100 may obtain a gain value using an average value of the audio signal and an average value of the noise signal. The electronic apparatus 100 may obtain a running average (Navg(k,n)) of the noise based on the second audio signal (s2).

The electronic apparatus 100 may obtain the running average (Savg(k,n)) of the voice based on the second audio signal (s2). For example, the electronic apparatus 100 may perform the operation of ISNR(k,n)=Savg(k,n)/Navg(k,n). k may represent a set of divided frequency domains. k may be a sign representing a sub-band. n may represent a discrete time.

The electronic apparatus 100 may obtain a gain value using ISNR(k,n). For example, the electronic apparatus 100 may perform the operation of g(k,n)=ISNR(k,n)/(ISNR(k,n)+1). The electronic apparatus 100 may obtain a gain value based on at least one of the ISNR or the OSNR.

The second audio signal (s2) may be represented by S(k,n).

The noise signal may be represented by N(k,n).

In an embodiment, the electronic apparatus 100 may perform the operation of Savg(k,n)=a Savg(k,n−1)+(1−a)S2$(n,k)$ on the sub-band (k). The electronic apparatus 100 may perform the operation of Navg(k,n)=a Navg(k,n−1)+(1−a) N2$(n,k)$ on the sub-band(k). a may be a constant. a may be a smoothing constant.

The first module 10 may transmit (or output) the second audio signal (s2) to the second module 20. The second module 20 may obtain the first gain value (g1) based on the second audio signal (s2). The second module 20 may transmit (or output) the first gain value (g1) to the third module 30.

The third module 30 may convert the first gain value (g1) to the second gain value (g2). The third module 30 may transmit (or output) the second gain value (g2) to the fourth module 40.

The fourth module 40 may include a deep neural network (DNN) module. The fourth module 40 may convert the second gain value (g2) to the third gain value (g3). The fourth module 40 may receive the second gain value (g2) as input data and obtain the third gain value (g3) as output data. The fourth module 40 may transmit (or output) the third gain value (g3) to the loss calculation module 41.

The loss calculation module 41 may receive the fourth gain value (g4) from the first module 10. The loss calculation module 41 may receive the third gain value (g3) from the fourth module 40. The loss calculation module 41 may obtain the fourth gain value (g4) minus the third gain value (g3) as a loss value. The loss value may be an absolute value of the fourth gain value (g4) minus the third gain value (g3).

The electronic apparatus 100 may learn the fourth module 40 such that the loss value obtained from the loss calculation module 41 is minimized.

Once the loss value is obtained by the loss calculation module 41, the loss calculation module 41 may transmit the loss value to the algorithm update module 42.

The algorithm update module 42 may change the parameters used by the fourth module 40 based on the received loss values. The algorithm update module 42 may transmit the changed parameters to the fourth module 40. The fourth module 40 may newly obtain the third gain value (g3) based on the changed parameters. The fourth module 40 may transmit the new third gain value (g3) to the loss calculation module 41.

According to various embodiments, the electronic apparatus 100 may change the parameters mentioned in FIG. 5 during the learning process. The operation of FIG. 5 may be used in the learning process of the fourth module 40.

According to various embodiments, the electronic apparatus 100 may change at least one parameter or at least one weight used in the first module 10, the second module 20, the third module 30, the fourth module 40, or the like, such that the loss value obtained in the loss calculation module 41 is minimized.

According to various embodiments, the second gain value (g2), the second noise value (N2), the second posteriori signal-to-noise ratio (ISNR2), the second priori signal-to-noise ratio (OSNR2), and the like mentioned in FIG. 6 may additionally be used in the learning operation of the fourth module 40.

Figure 8:
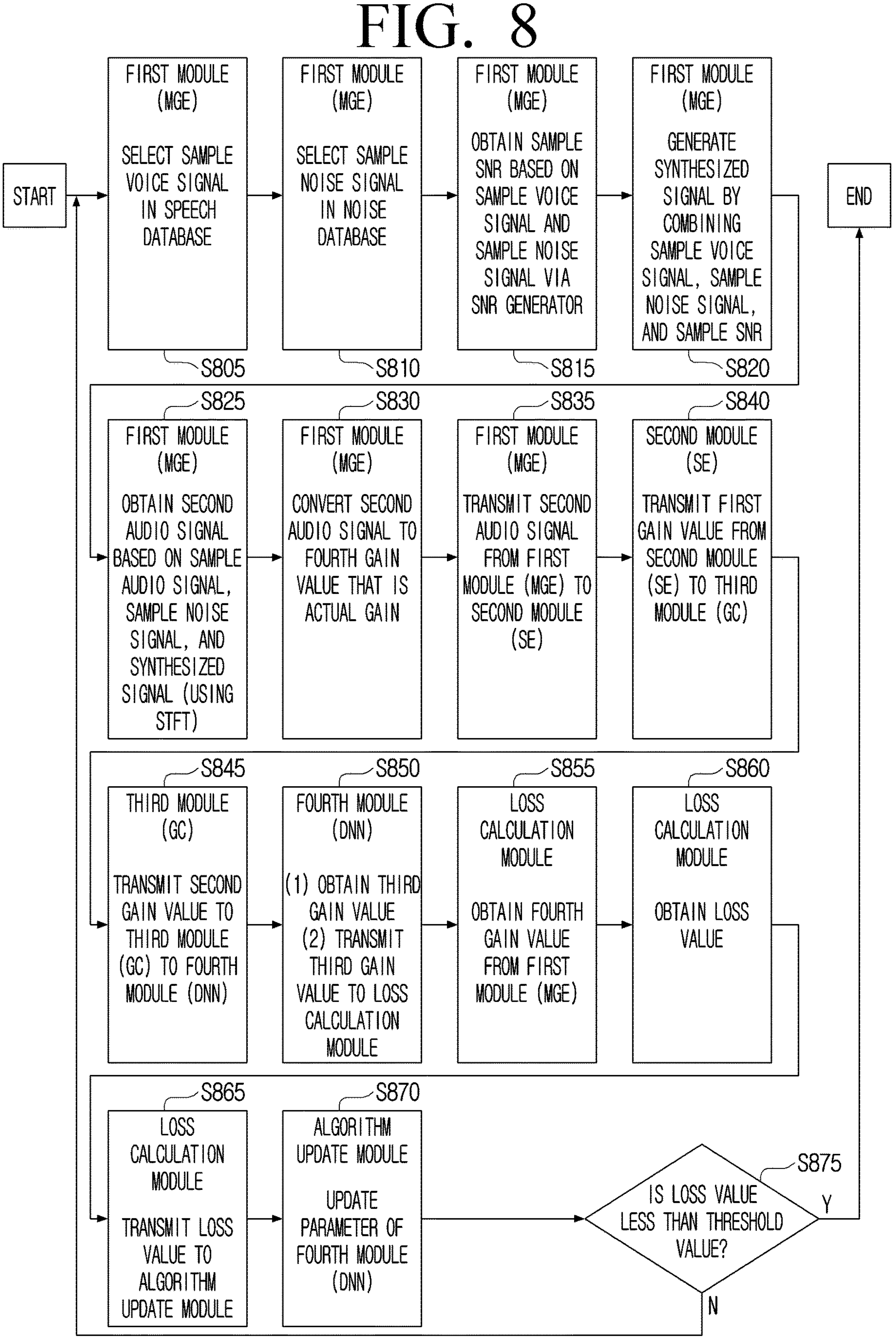
FIG. 8 is a flowchart illustrating an example learning process of a fourth module according to various embodiments.

FIG. 8 is a flowchart illustrating an example learning process of a fourth module according to various embodiments.

Referring to FIG. 8, the electronic apparatus 100 may, via the first module 10, select a sample voice signal from the speech database 11 (S805).

The electronic apparatus 100 may select a sample noise signal from the noise database 12 (S810).

The electronic apparatus 100 may, via the SNR generator 13, obtain a sample SNR based on the voice signal and the noise signal (S815).

The electronic apparatus 100 may generate a synthesized signal by combining the sample voice signal, the sample noise signal, and the sample SNR (S820).

The electronic apparatus 100 may generate the second audio signal (s2) based on the sample voice signal, the sample noise signal, and the synthesized signal (S825). The electronic apparatus 100 may use STFT.

The electronic apparatus 100 may convert the second audio signal (s2) to a fourth gain value (g4), which is the actual gain value (S830).

The electronic apparatus 100 may transmit (or output) the second audio signal (s2) from the first module 10 to the second module 20 (S835).

The electronic apparatus 100 may convert the second audio signal (s2) to the first gain value (g1) via the second module 20.

The electronic apparatus 100 may transmit (or output) the first gain value (g1) from the second module 20 to the third module 30 (S840).

The electronic apparatus 100 may convert the first gain value (g1) to the second gain value (g2) via the third module 30.

The electronic apparatus 100 may transmit (or output) the second gain value (g2) from the third module 30 to the fourth module 40 (S845).

The electronic apparatus 100 may convert the second gain value (g2) to the third gain value (g3) via the fourth module 40, and transmit (or output) the third gain value (g3) to the loss calculation module 41 (S850).

The electronic apparatus 100 may transmit (or output) the fourth gain value (g4) from the first module 10 to the loss calculation module 41. The loss calculation module 41 may obtain the fourth gain value (g4) from the first module 10 (S855). The loss calculation module 41 may obtain a loss value based on the fourth gain value (g4) and the third gain value (g3) (S860).

The loss calculation module 41 may transmit (or output) the loss value to the algorithm update module 42 (S865). The algorithm update module 42 may update the parameters of the fourth module 40 based on the loss value (S870).

The electronic apparatus 100 may perform learning of the fourth module 40 by updating the parameters of the fourth module 40. The electronic apparatus 100 may determine whether the loss value is below a threshold value (S875).

When the loss value is less than the threshold value (S875-Y), the electronic apparatus 100 may discontinue the learning operation for the fourth module 40.

When the loss value is not less than the threshold value (S875-N), the electronic apparatus 100 may repeat steps S805 through S875.

Figure 9:
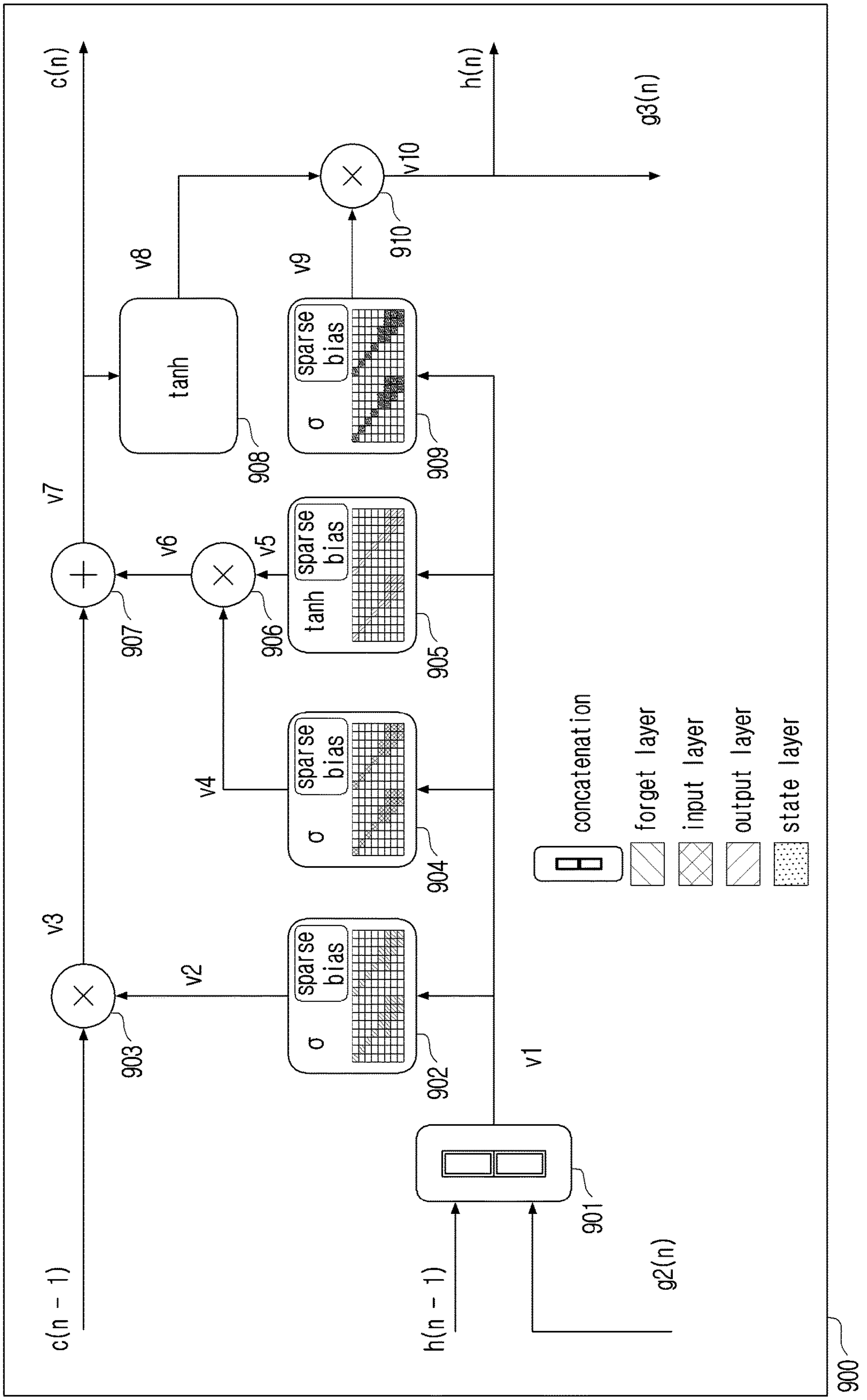
FIG. 9 is a view provided to explain an example fourth module according to various embodiments.

FIG. 9 is a view provided to explain an example fourth module according to various embodiments.

The example 900 of FIG. 9 may illustrate the structure of the fourth module 40. The fourth module 40 may be, for example, a module that uses a Recurrent Neural Network (RNN). The fourth module 40 may use a Long Short-Term Memory (LSTM).

c(n) may represent the memory state of the LSTM.

h(n) may represent the hidden state of the LSTM.

For example, c(n) may be information representing an audio signal. c(n) may be information representing the audio signal at time n, and c(n−1) may be information representing the audio signal at time n−1. Although c(n) is described as information representing an audio signal, it is not necessarily limited thereto. The value corresponding to c(n) may change depending on the user settings or input.

For example, h(n) may be information representing a denoised audio signal. h(n) may be information representing the denoised audio signal at time n, and h(n−1) may be information representing the denoised audio signal at time n−1. Although h(n) is described as information representing a denoised audio signal, it is not necessarily limited thereto. The value corresponding to h(n) may change based on user settings or input.

g2(*n*) may represent the second gain value (g2) at time n.

g3(*n*) may represent the third gain value (g3) at time n.

The fourth module 40 may include at least one of a first computation module 901, a second computation module 902, a third computation module 903, a fourth computation module 904, a fifth computation module 905, a sixth computation module 906, a seventh computation module 907, an eighth computation module 908, a ninth computation module 909, or a tenth computation module 910.

The fourth module 40 may obtain a first value (v1) by combining the denoised audio signal at time n−1 with the second gain value (g2) at time n via the first computation module 901.

The fourth module 40 may obtain a second value (v2) by inputting the first value (v1) to the second computation module 902. The second computation module 902 may include, for example, a forget layer. The second computation module 902 may determine to what extent to keep or discard information of the previous time step based on a preset bias or a preset weight.

The fourth module 40 may obtain a third value (v3) by multiplying the second value (v2) and information representing the audio signal at time n−1 via the third computation module 903.

The fourth module 40 may obtain a fourth value (v4) by inputting the first value (v1) to the fourth computation module 904. The fourth computation module 904 may include an input layer. The fourth computation module 904 may determine how to process the input data based on a preset bias or a preset weight.

The fourth module 40 may obtain a fifth value (v5) by inputting the first value (v1) to the fifth computation module 905. The fifth computation module 905 may include an output layer. The fifth computation module 905 may determine how to process the output data based on a preset bias or a preset weight.

The fourth module 40 may obtain a sixth value (v6) by combining the fourth value (v4) and the fifth value (v5) via the sixth computation module 906.

The fourth module 40 may obtain a seventh value (v7) by summing the third value (v3) and the sixth value (v6) via the seventh computation module 907.

The fourth module 40 may convert the seventh value (v7) to an eighth value (v8) via the eighth computation module 908. The eighth computation module 908 may include an activation function (e.g., a tanh function).

The fourth module 40 may obtain a ninth value (v9) by inputting the first value (v1) to the ninth computation module 909. The ninth computation module 909 may include a state layer. The ninth computation module 909 may determine how to process the state data based on a preset bias or a preset weight. The state data may include information representing the state of the audio signal. The state of the audio signal may include information associated with the SNR, which represents a ratio of the voice signal and the audio signal.

The fourth module 40 may obtain a tenth value (v10) by multiplying the eighth value (v8) and the ninth value (v9) via the tenth computation module 910.

The fourth module 40 may obtain the third gain value (g3) based on the tenth value (v10).

According to various embodiments, the first gain value (g1), rather than the second gain value (g2), may be input to the first computation module 901.

According to various embodiments, the fourth module 40 may obtain the fourth gain value (g4) based on the tenth value (v10).

Figure 10:
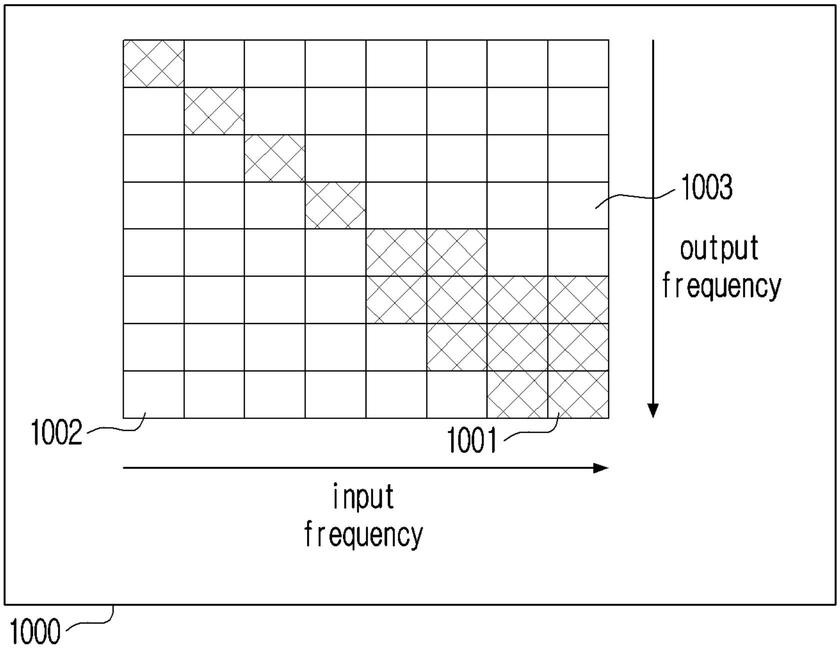
FIG. 10 illustrates an example band matrix according to various embodiments.

FIG. 10 illustrates an example band matrix according to various embodiments.

The example 1000 of FIG. 10 illustrates a band matrix performed on the fourth computation module 904 of FIG. 9.

The band matrix may include a zero element and a non-zero element. The band matrix may be a matrix where the zero elements are provided in the form of diagonal.

A first area 1001 may include a non-zero element. A second area 1002 and a third area 1003 may include zero elements.

The fourth value (v4) of FIG. 9 may include information representing the band matrix of FIG. 10.

Figure 11:
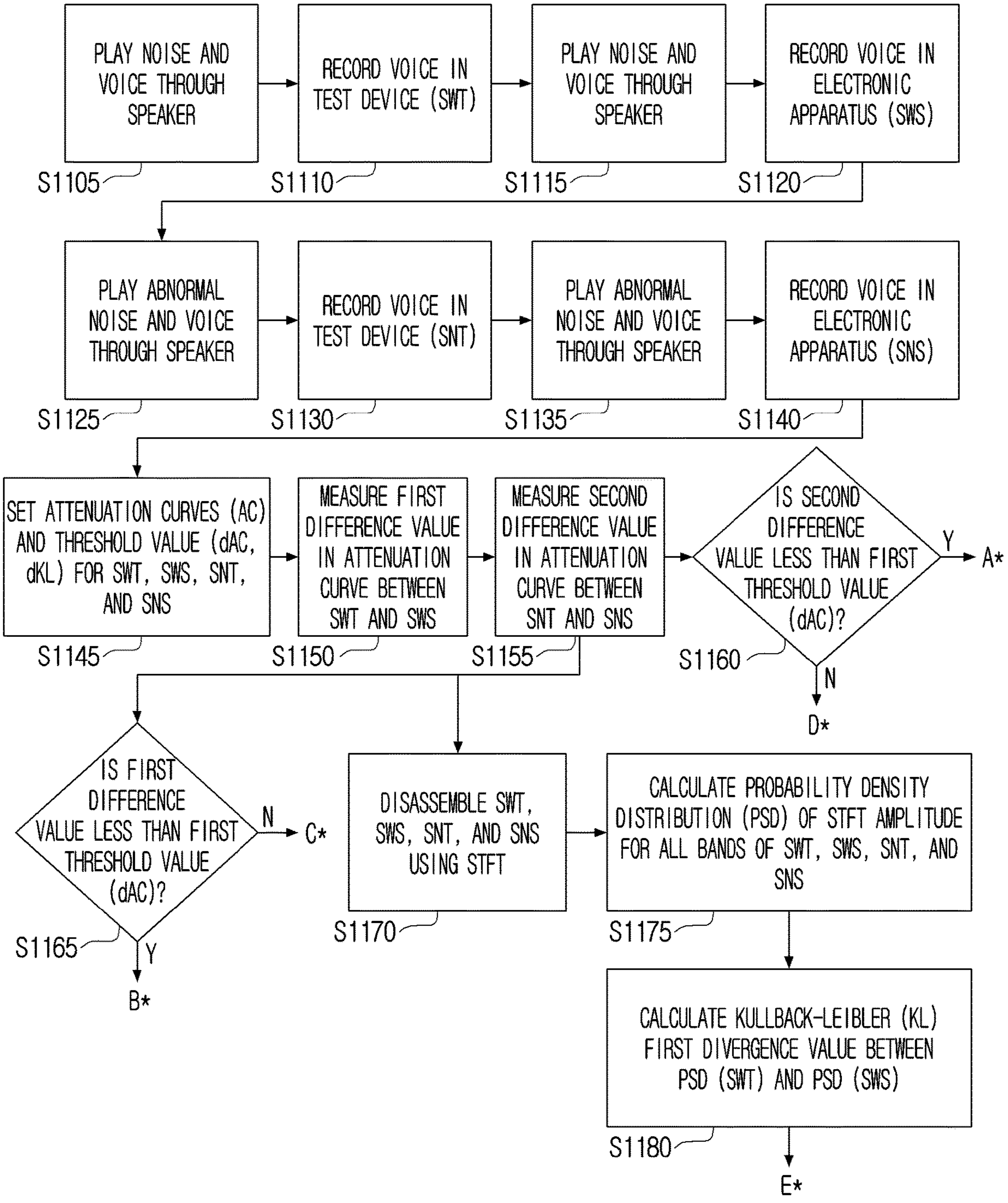
FIG. 11 is a flowchart illustrating an example operation of determining similar device (or operations) according to various embodiments.

FIG. 11 is a flowchart illustrating an example operation of determining similar device (or operations) according to various embodiments.

Referring to FIG. 11, noises and voices may be played through a speaker (S1105).

A test device may record audio (S1110). The recorded results may be described as a Spectrum White noise Test device (SWT).

Noises and voices may be played through a speaker (S1115).

The electronic apparatus 100 may record audio (S1120). The recorded results may be described as a Spectrum White noise Samsung device (SWS).

Abnormal noises and voices may play through a speaker (S1125).

The test device may record audio (S1130). The recorded results may be described as a Spectrum real world Noise Test device (SNT).

Abnormal noises and voices may be playing through a speaker (S1135).

The electronic apparatus 100 may record audio (S1140). The recorded results may be described as a Spectrum real world Noise Samsung device (SNS).

The electronic apparatus 100 may determine attenuation curves (AC) and set threshold values (dAC, dKL) for the SWT, SWS, SNT, and SNS (S1145).

The electronic apparatus 100 may measure a first difference value between the attenuation curve of the SWT and the attenuation curve of the SWS (S1150).

The electronic apparatus 100 may measure a second difference value between the attenuation curve of the SNT and the attenuation curve of the SNS (S1155).

The electronic apparatus 100 may determine whether the second difference value is less than a first threshold value (dAC) (S1160).

If the second difference value is less than the first threshold value (dAC) (S1160-Y), the electronic apparatus 100 may determine that a preset event (A*) has occurred.

If the second difference value is not less than the first threshold value (dAC) (S1160-N), the electronic apparatus 100 may determine that a preset event (D*) has occurred.

The electronic apparatus 100 may determine whether the first difference value is less than the first threshold value (dAC) (S1165).

If the first difference value is less than the first threshold (dAC) (S1165-Y), the electronic apparatus 100 may determine that a preset event (B*) has occurred.

If the first difference value is not less than the first threshold (dAC) (S1165-N), the electronic apparatus 100 may determine that a preset event (C*) has occurred.

The electronic apparatus 100 may disassemble each of the SWT, SWS, SNT, and SNS using the STFT (S1170).

The electronic apparatus 100 may calculate a probability density distribution (PSD) of the STFT amplitude for all bands of the SWT, SWS, SNT, and SNS (S1175).

The electronic apparatus 100 may calculate a Kullback-Leibler (KL) first divergence between the PSD (SWT) and the PSD (SWS) (S1180). The electronic apparatus 100 may determine that a preset event (E*) has occurred.

The preset events (A*, B*, C*, D*, E*) will be described in detail with reference to FIG. 12.

Figure 12:
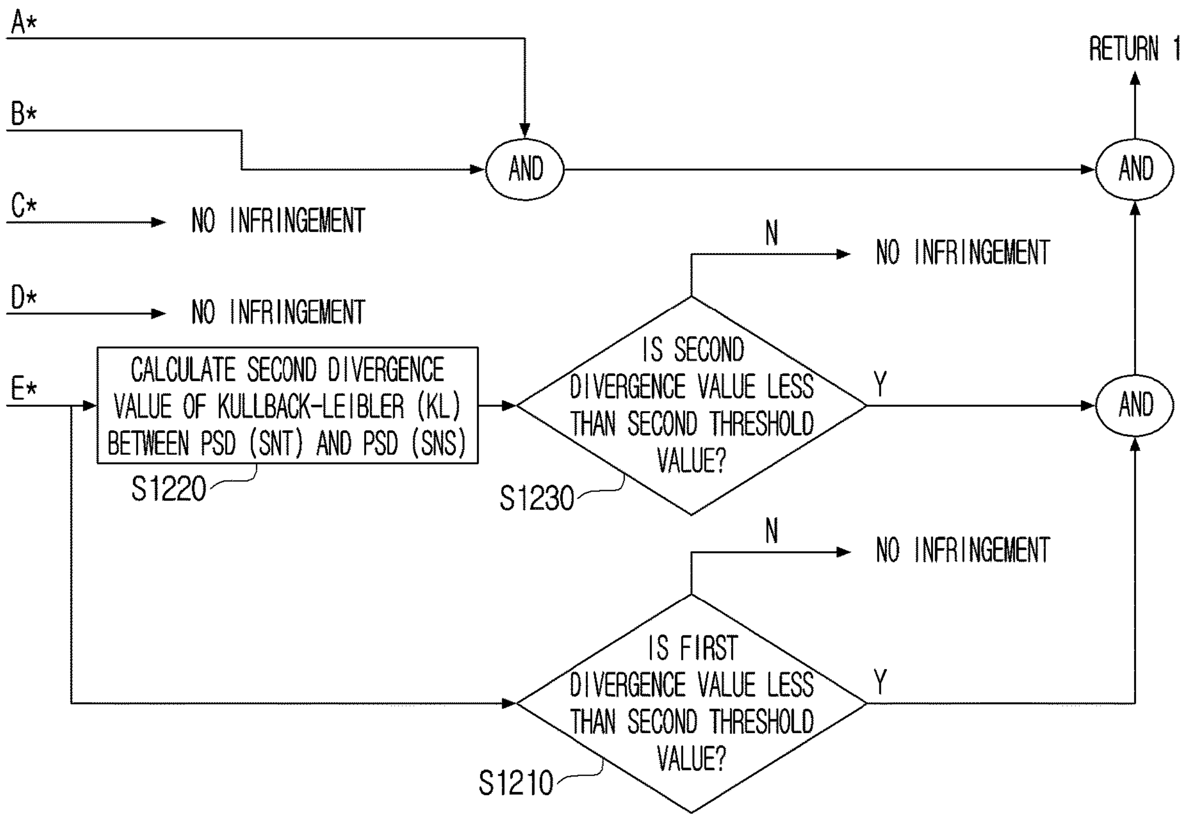
FIG. 12 is a view provided to explain an operation of determining similar device (or operations) according to an embodiment.

FIG. 12 is a view provided to explain an operation of determining similar device (or operations) according to various embodiments.

If an event is identified where the second difference value is not less than the first threshold value (dAC) (S1160-N, D*), the test device may determine that the electronic apparatus 100 is not similar device (or operations).

If an event is identified where the first difference value is not less than the first threshold value (dAC) (S1165-N, C*), the test device may determine that the electronic apparatus 100 is not similar device (or operations).

After obtaining the first divergence value, the electronic apparatus 100 may determine whether the first divergence value is less than a second threshold value (dKL) (S1210).

If the first divergence value is not less than the second threshold value (dKL), the test device may determine that the electronic apparatus 100 is not similar device (or operations) (S1210-N).

After obtaining the first divergence value, the electronic apparatus 100 may calculate a Kullback-Leibler (KL) second divergence value between the PSD (SNT) and the PSD (SNS) (S1220).

After obtaining the second divergence value, the electronic apparatus 100 may determine (S1230) whether the second divergence value is less than the second threshold value (dKL).

If the second divergence value is not less than the second threshold value (dKL) (S1230-N), the test device may determine that the electronic apparatus 100 is not similar device (or operations).

If an event (S1160-Y, A*) in which the second difference value is less than the first threshold value (dAC), an event (S1165-Y, B*) in which the first difference value is less than the first threshold value (dAC), an event (S1210-Y) in which the first divergence value is less than the second threshold value (dKL), or an event (S1230-Y) in which the second divergence value is less than the second threshold value (dKL) are identified, the electronic apparatus 100 may obtain a return value 1. If the return value 1 is obtained, the test device may determine that the electronic apparatus 100 is similar device (or operations).

If the return value of 1 is obtained, the electronic apparatus 100 may determine that the test device and the electronic apparatus 100 perform the same denoising function.

Figure 13:
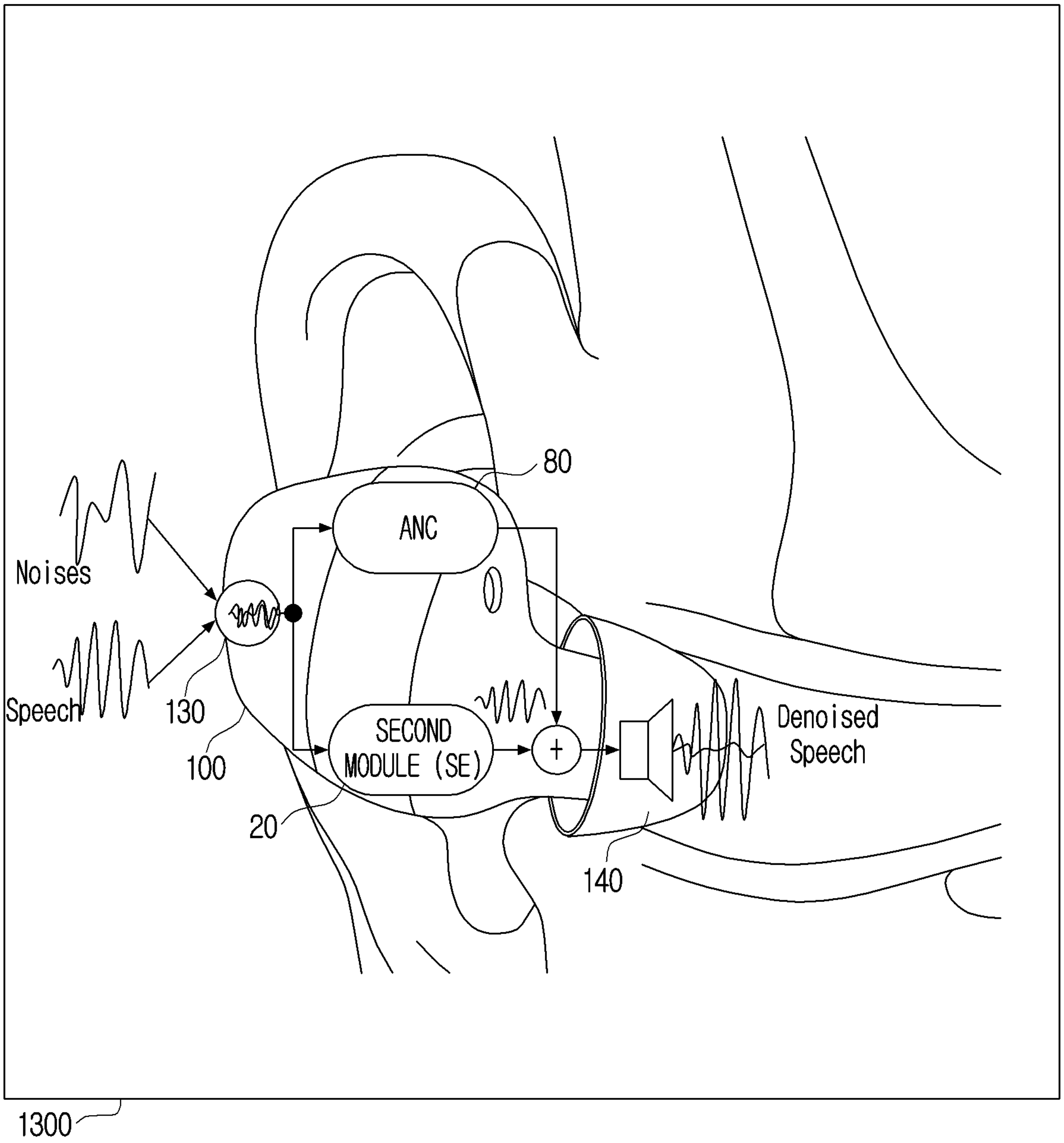
FIG. 13 illustrates an example embodiment in which noise cancellation is performed through an earphone according to various embodiments.

FIG. 13 illustrates an example embodiment in which noise cancellation is performed through an earphone according to various embodiments.

Referring to the example 1300 of FIG. 13, the electronic apparatus 100 may be implemented as an earphone. The electronic apparatus 100 may include at least one of the second module 20 or an active noise control (ANC) module 80.

The ANC module 80 may be, for example, a module that performs an active noise cancellation function. The active noise cancellation function may be a function that generates a reverse noise signal that is opposite to a noise component. The active noise cancellation function may be a function that combines the noise signal and the reverse noise signal to cancel out the noise component.

The electronic apparatus 100 may obtain the first audio signal (s1) that includes a voice signal and a noise signal. The electronic apparatus 100 may obtain the first audio signal (s1) via a microphone.

The electronic apparatus 100 may obtain a first filtering signal from the first audio signal (s1) via the ANC module 80.

The electronic apparatus 100 may obtain the first gain value (g1) from the first audio signal (s1) via the second module 20. The electronic apparatus 100 may obtain the second gain value (g2) via the third module 30. The at least one processor 120 may obtain the third gain value (g3) via the fourth module 40.

The electronic apparatus 100 may convert the second audio signal (s2) to the third audio signal (s3) based on the first filtering signal and the third gain value (g3).

In the operation of obtaining the fourth audio signal (s4) in the embodiment of FIG. 3, the first filtering signal obtained via the ANC module 80 may be further used.

The electronic apparatus 100 may obtain the first filtering signal via the ANC module 80 and the first gain value (g1) from the first audio signal (s1) via the second module 20. The electronic apparatus 100 may obtain (or generate) a denoised speech based on the first filtering signal and the first gain value (g1) (or at least one of g1, g2, g3). The electronic apparatus 100 may output the obtained (or generated) denoised speech through a speaker (140).

Figure 14:
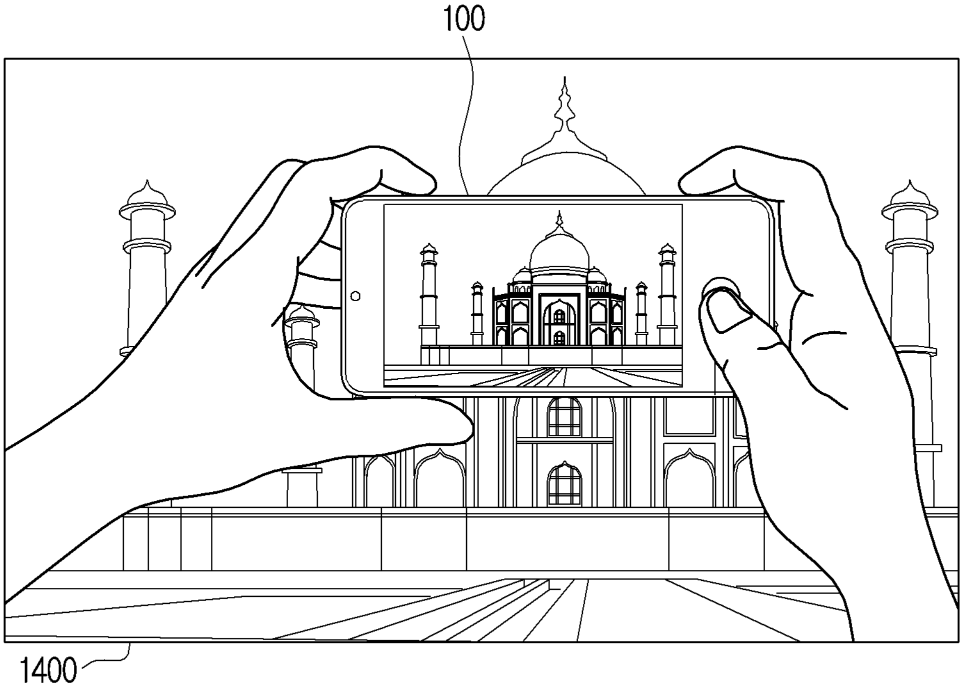
FIG. 14 illustrates an example noise cancellation performed through a smart device according to various embodiments.

FIG. 14 illustrates an example noise cancellation performed through a smart device according to various embodiments.

Referring to the example 1400 of FIG. 14, the electronic apparatus 100 may obtain the first audio signal (s1) outdoors. The electronic apparatus 100 may obtain an audio signal including both a voice signal and a noise signal, outdoors via a built-in microphone.

The electronic apparatus 100 may be a smart device including a microphone. The smart device may include a smartphone, a tablet, a smart watch, smart glasses, or the like.

Once the first audio signal (s1) is received, the electronic apparatus 100 may obtain the fourth audio signal (s4) through a noise filtering function.

For example, in response to receiving a user command to initiate voice recording or video recording, the electronic apparatus 100 may activate the microphone. The electronic apparatus 100 may obtain the first audio signal (s1) including a voice signal and a noise signal via the activated microphone. The electronic apparatus 100 may perform a noise filtering function based on the first audio signal (s1). The electronic apparatus 100 may obtain the fourth audio signal (s4) through the noise filtering function. The electronic apparatus 100 may start voice recording or video recording based on a user command, and may perform a noise filtering function on the first audio signal (s1) collected during voice recording or video recording. The electronic apparatus 100 may store the fourth audio signal (s4) on which the noise filtering function has been performed.

Figure 15:
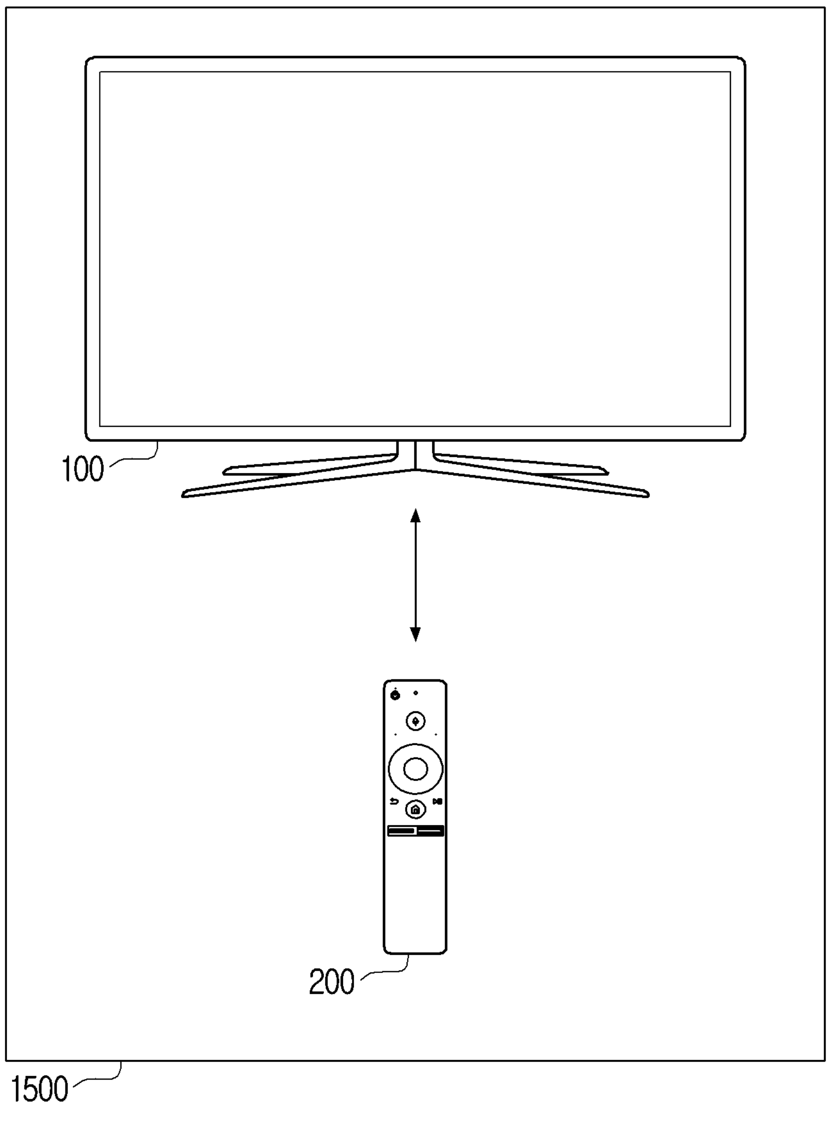
FIG. 15 illustrates example noise cancellation performed through a display device and a remote-control device according to various embodiments.

FIG. 15 illustrates example noise cancellation performed through a display device and a remote-control device according to various embodiments.

Referring to the example 1500 of FIG. 15, the electronic apparatus 100 may be an apparatus including a display. The electronic apparatus 100 may be communicatively connected to the external device 200.

The external device 200 may be, for example, a remote-control device. The external device 200 may be a remote-control device capable of controlling the electronic apparatus 100. The external device 200 may include a microphone and a communication interface.

The external device 200 may obtain the first audio signal (s1) in response to a user command. Once the first audio signal (s1) is obtained, the external device 200 may transmit the first audio signal (s1) to the electronic apparatus 100.

When the first audio signal (s1) is received from the external device 200, the electronic apparatus 100 may perform a noise filtering function to obtain the fourth audio signal (s4).

Figure 16:
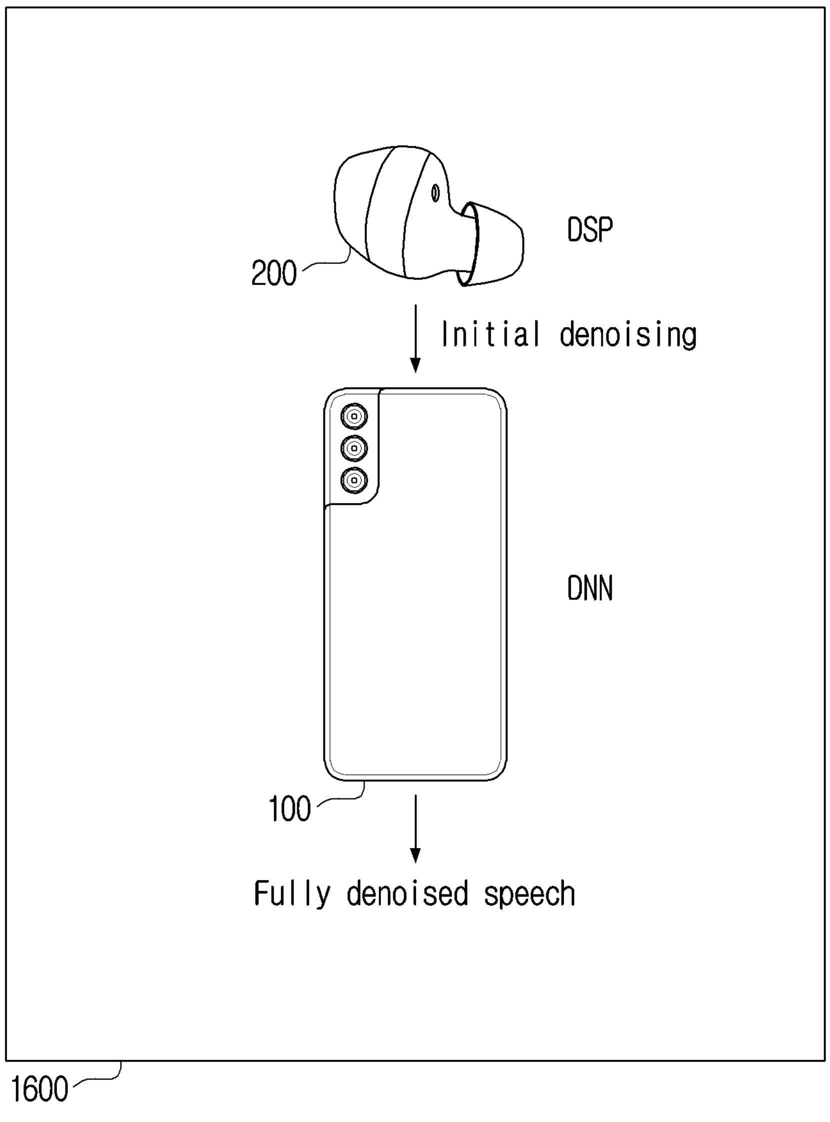
FIG. 16 illustrates an example of obtaining an audio signal through an earphone according to various embodiments.

FIG. 16 illustrates an example of obtaining an audio signal through an earphone according to various embodiments.

Referring to the example 1600 of FIG. 16, the electronic apparatus 100 may perform communication with the external device 200.

The external device 200 may be a device including a microphone. The external device 200 may obtain the first audio signal (s1) via the microphone. The external device 200 may perform a first noise filtering function included in the external device 200. The external device 200 may obtain a first filtering signal in which noise is removed from the first audio signal (s1). The external device 200 may transmit at least one of the first audio signal (s1) or the first filtering signal to the electronic apparatus 100.

The electronic apparatus 100 may receive at least one of the first audio signal (s1) or the first filtering signal from the external device 200. The electronic apparatus 100 may perform a second noise filtering function based on at least one of the first audio signal (s1) or the first filtering signal.

The first noise filtering function may be performed in the external device 200 and the second noise filtering function may be performed in the electronic apparatus 100. The first noise filtering function performed on the external device 200 may be an active noise cancellation function as described in FIG. 13.

Figure 17:
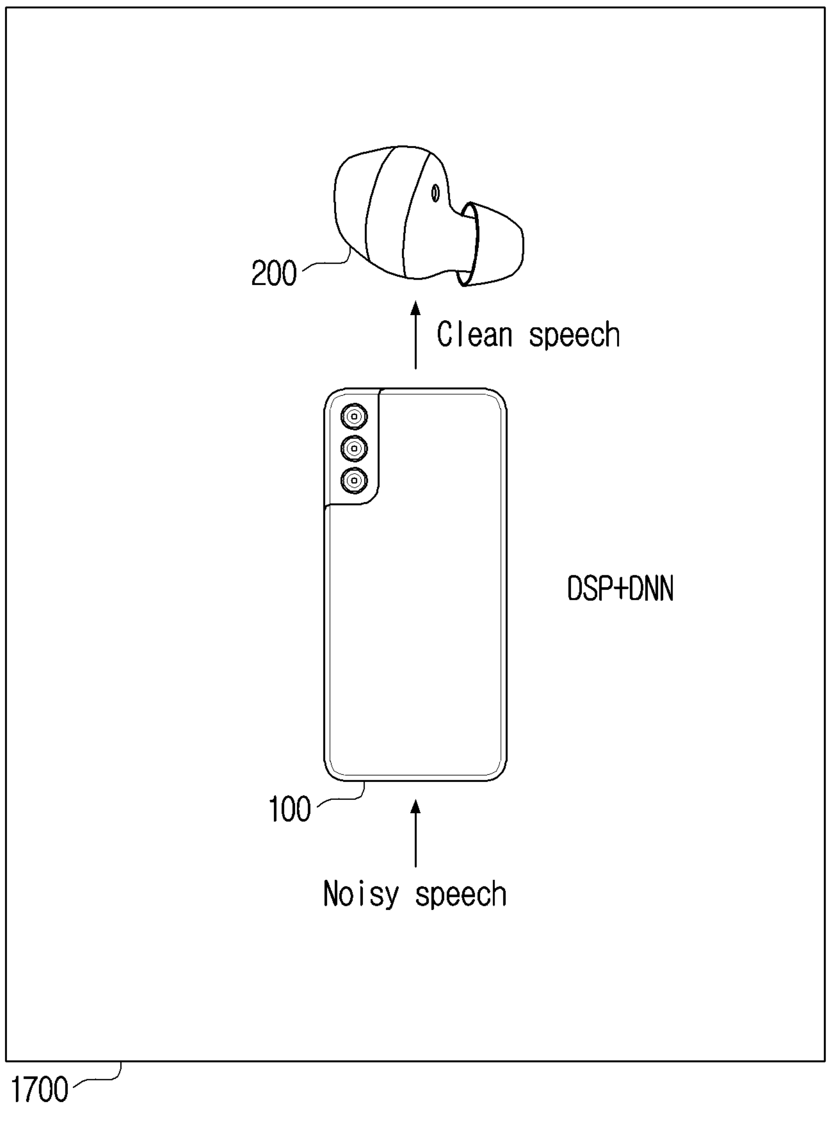
FIG. 17 illustrates an example of obtaining an audio signal through a smart device according to various embodiments.

FIG. 17 illustrates an example of obtaining an audio signal through a smart device according to various embodiments.

Referring to the example 1700 of FIG. 17, the electronic apparatus 100 may include a microphone. The electronic apparatus 100 may obtain the first audio signal (s1) via the microphone.

According to various embodiments, the electronic apparatus 100 may receive the first audio signal (s1) from an external server. For example, the audio of a call voice from the other party may be received via the external server.

The electronic apparatus 100 may perform a noise filtering function on the first audio signal (s1). The electronic apparatus 100 may obtain the fourth audio signal (s4) by performing the noise filtering function.

The electronic apparatus 100 may transmit the fourth audio signal (s4) to the external device 200. The external device 200 may receive the fourth audio signal (s4) from the electronic apparatus 100. The external device 200 may output the received fourth audio signal (s4). The external device 200 may include a speaker. The external device 200 may output the fourth audio signal (s4) via the speaker.

Figure 18:
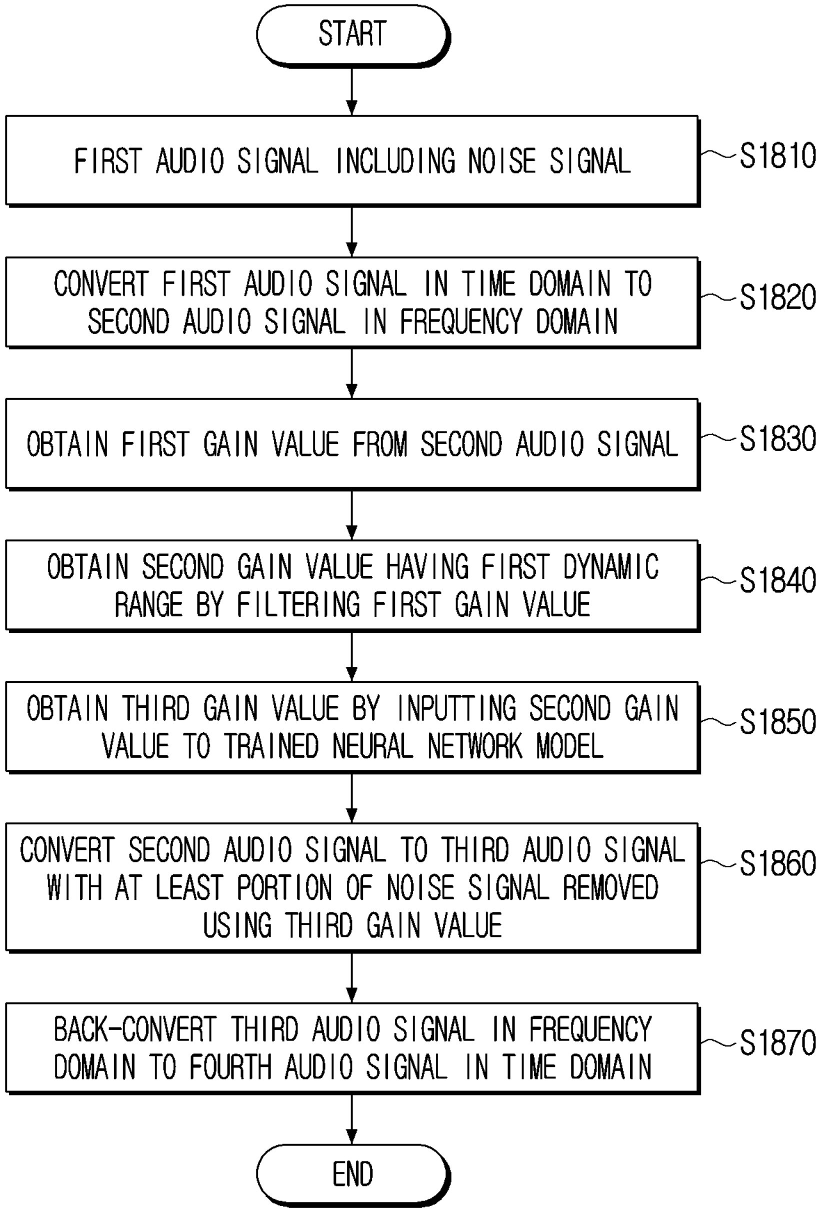
FIG. 18 is a flowchart illustrating an example operation of obtaining an audio signal from which noise is removed according to various embodiments.

FIG. 18 is a flowchart illustrating an example operation of obtaining an audio signal from which noise is removed according to various embodiments.

Referring to FIG. 18, the electronic apparatus 100 may obtain the first audio signal (s1) including a voice signal and a noise signal (S1810).

The electronic apparatus 100 may convert the first audio signal (s1) in the time domain to the second audio signal (s2) in the frequency domain (S1820).

The electronic apparatus 100 may obtain the first gain value (g1) representing a signal-to-noise ratio from the second audio signal (s2) (S1830).

The electronic apparatus 100 may obtain the second gain value (g2) having a first dynamic range by filtering the first gain value (g1) (S1840).

The electronic apparatus 100 may obtain the third gain value (g3) by inputting the second gain value (g2) to a neural network model trained to output a denoised signal (S1850).

The electronic apparatus 100 may use the third gain value (g3) to convert the second audio signal (s2) to the third audio signal (s3) with at least a portion of the noise signal removed (S1860).

The electronic apparatus 100 may back-convert the third audio signal (s3) in the frequency domain to the fourth audio signal (s4) in the time domain (S1870).

Figure 19:
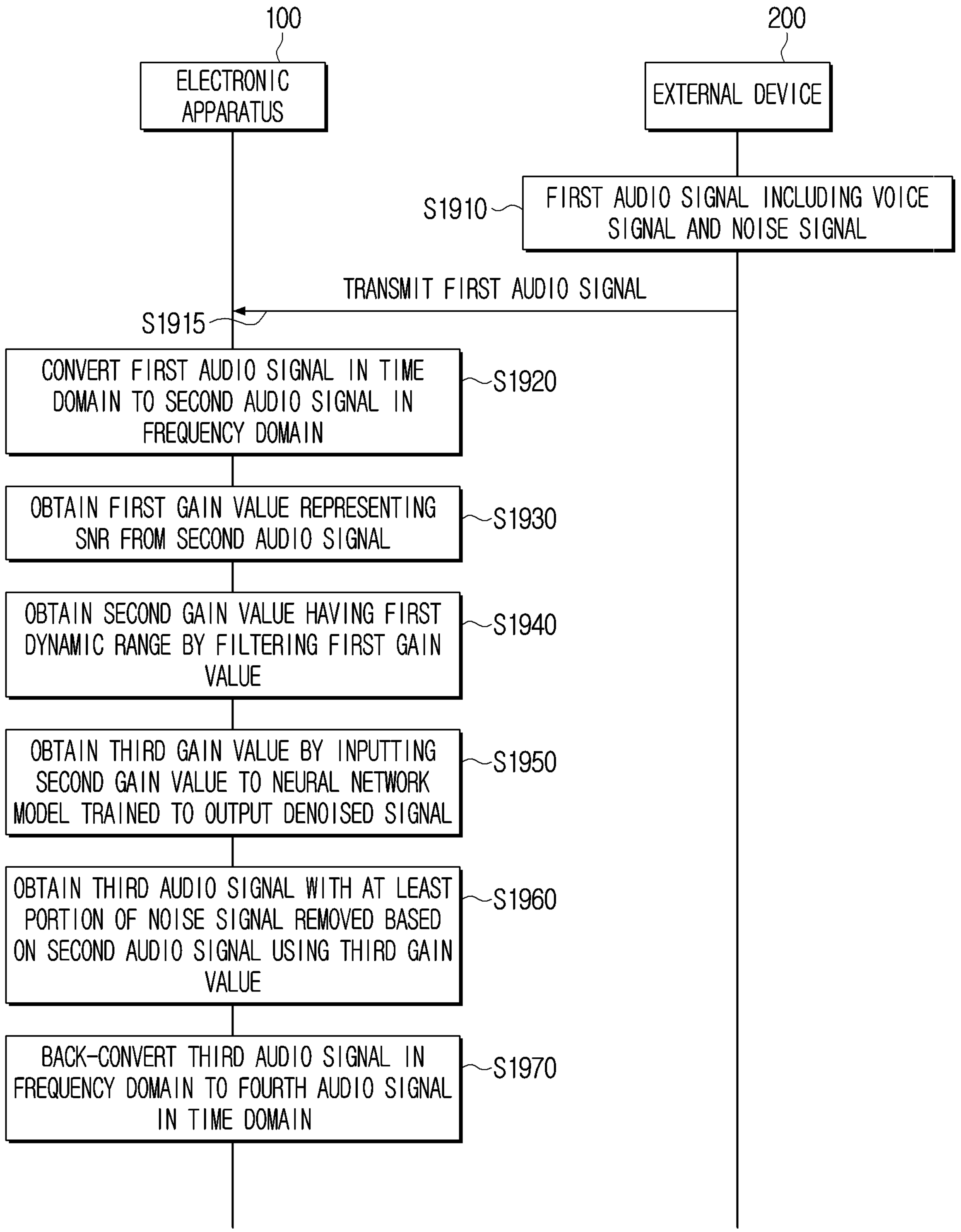
FIG. 19 is a flowchart illustrating an example noise cancellation operation through an electronic apparatus and an external device according to various embodiments.

FIG. 19 is a flowchart illustrating an example noise cancellation operation through the electronic apparatus 100 and the external device 200 according to various embodiments.

The steps S1910, S1920, S1930, S1940, S1950, S1960, and S1970 of FIG. 19 may correspond to the steps S1810, S1820, S1830, S1840, S1850, S1860, and S1870 of FIG. 18. Therefore, redundant descriptions are not repeated.

Referring to FIG. 19, the external device 200 may obtain the first audio signal (s1) including a voice signal and a noise signal (S1910).

According to various embodiments, the external device 200 may include a microphone. The external device 200 may obtain the first audio signal (s1) via the microphone.

According to various embodiments, the external device 200 may be a server that obtains the first audio signal (s1).

The external device 200 may transmit the first audio signal (s1) to the electronic apparatus 100 (S1915).

The electronic apparatus 100 may receive the first audio signal (s1) from the external device 200. The electronic apparatus 100 may perform steps S1920 through S1970.

Figure 20:
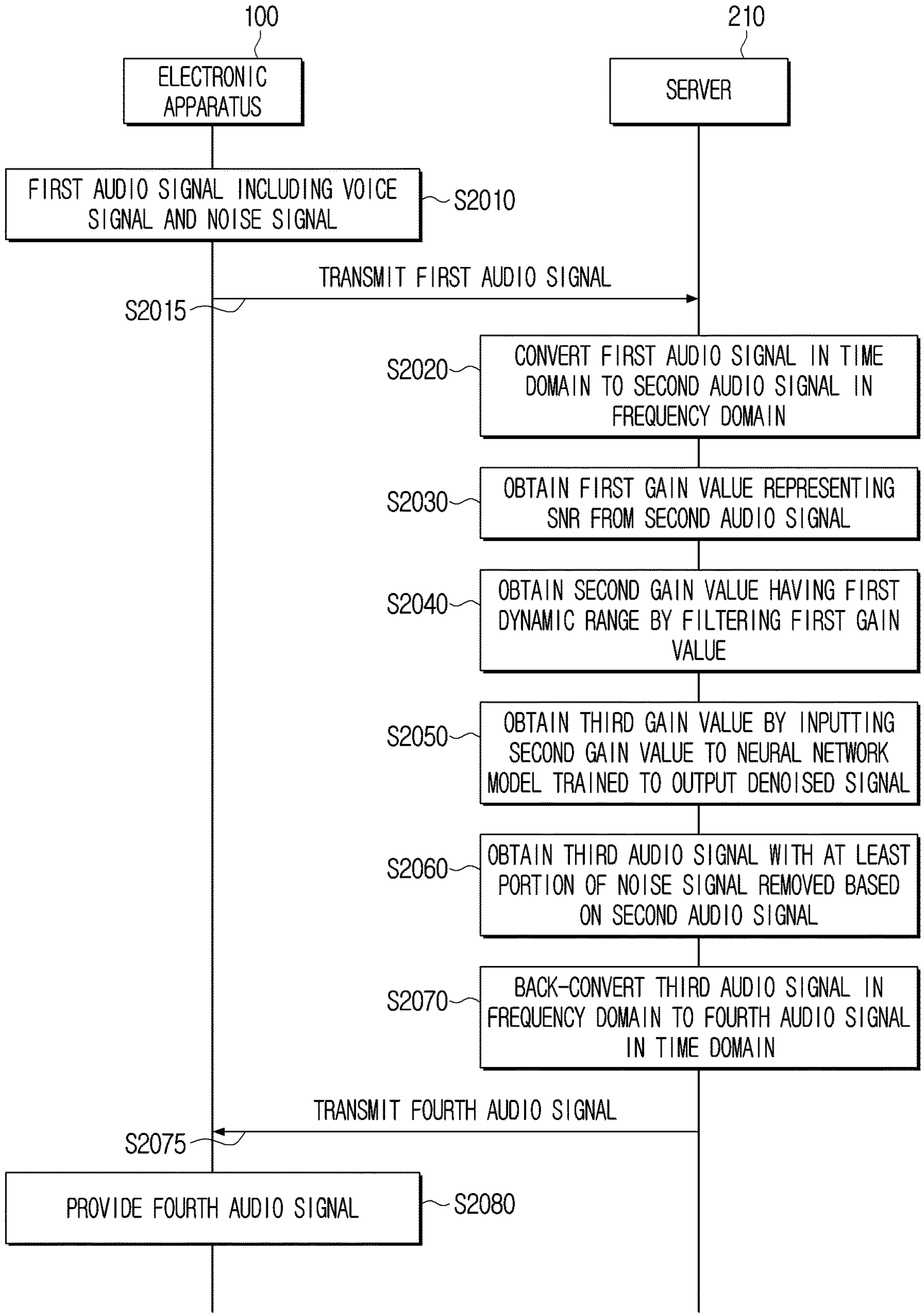
FIG. 20 is a flowchart illustrating an example noise cancellation operation through an electronic apparatus and a server according to various embodiments.

FIG. 20 is a flowchart illustrating an example noise cancellation operation through the electronic apparatus 100 and a server 210 according to various embodiments.

The steps S2010, S2020, S2030, S2040, S2050, S2060, and S2070 of FIG. 20 may correspond to the steps S1810, S1820, S1830, S1840, S1850, S1860, and S1870 of FIG. 18. Therefore, redundant descriptions are not repeated.

Referring to FIG. 20, the electronic apparatus 100 may obtain the first audio signal (s1) (S2010). The electronic apparatus 100 may transmit the first audio signal (s1) to the server 210 (S2015).

The server 210 may be a device that performs a noise filtering function. The server 210 may receive the first audio signal (s1) from the electronic apparatus 100.

The server 210 may perform steps S2020 through S2070. Once the fourth audio signal (s4) is obtained, the server 210 may transmit the fourth audio signal (s4) to the electronic apparatus 100 (S2075).

The electronic apparatus 100 may receive the fourth audio signal (s4) from the server 210. The electronic apparatus 100 may provide the fourth audio signal (s4) (S2080). The electronic apparatus 100 may include a speaker. The electronic apparatus 100 may output the fourth audio signal (s4) via the speaker.

The electronic apparatus 100 may receive the fourth audio signal (s4) and store the same in the memory.

According to various embodiments, the electronic apparatus 100 may transmit the fourth audio signal (s4) to an external device. The external device may output the fourth audio signal (s4).

Figure 21:
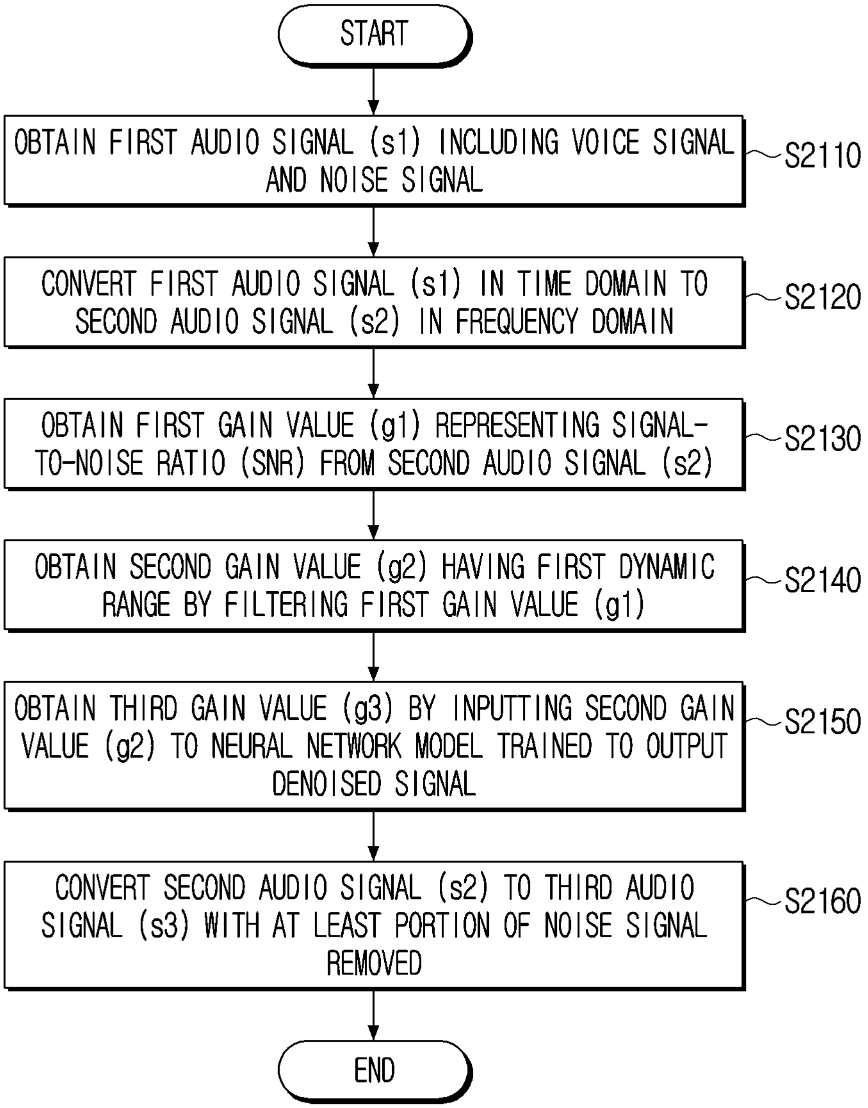
FIG. 21 is a flowchart illustrating an example controlling method of an electronic apparatus according to various embodiments.

FIG. 21 is a flowchart illustrating an example controlling method of the electronic apparatus 100 according to various embodiments.

Referring to FIG. 21, the controlling method of the electronic apparatus 100 includes: obtaining the first audio signal (s1) including a voice signal and a noise signal (S2110); converting the first audio signal (s1) in the time domain to the second audio signal (s2) in the frequency domain (S2120); obtaining the first gain value (g1) representing a signal-to-noise ratio (SNR) from the second audio signal (s2) (S2130); obtaining the second gain value (g2) having the first dynamic range by filtering the first gain value (g1) (S2140); obtaining the third gain value (g3) by inputting the second gain value (g2) having the first dynamic range to a neural network model trained to output a denoised signal (S2150); and converting the second audio signal (s2) to the third audio signal (s3) having at least a portion of the noise signal removed, using the third gain value (v3) (S2160).

In a embodiment, the controlling method may further include the step of back-converting the third audio signal (s3) in the frequency domain to the fourth audio signal (s4) in the time domain.

In an embodiment, the step S2120 of converting the first audio signal (s1) to the second audio signal (s2) may including converting the first audio signal (s1) to the second audio signal (s2) using Short-Time Fourier Transform (STFT).

In an embodiment, the step of obtaining the first gain value (g1) (S2130) may include obtaining at least one of a first noise value, a first posteriori signal-to-noise ratio (SNR), or a first priori SNR based on the second audio signal (s2), and obtaining the first gain value (g1) based on at least one of the first noise value, the first posteriori SNR, or the first priori SNR.

In an embodiment, the step of obtaining the first gain value (g1) (S2130) may include obtaining the first noise value from the second audio signal (s2) based on a first parameter stored in the electronic apparatus (100), obtaining the first posteriori signal-to-noise ratio from the second audio signal (s2) and the first noise value based on a second parameter stored in the electronic apparatus (100), and obtaining the first priori signal-to-noise ratio from the second audio signal (s2) and the first posteriori signal-to-noise ratio based on a third parameter stored in the electronic apparatus (100), and obtaining the first gain value (g1) from the second audio signal (s2) and the first priori signal-to-noise ratio based on a fourth parameter stored in the electronic apparatus (100).

In an embodiment, the controlling method may further include obtaining a second noise value having a second dynamic range by filtering the first noise value, obtaining a second posteriori signal-to-noise ratio having a third dynamic range by filtering the first posteriori signal-to-noise ratio, and obtaining a second priori signal-to-noise ratio having a fourth dynamic range by filtering the first priori signal-to-noise ratio.

In an embodiment, the step S2150 of obtaining the third gain value (g3) may include obtaining the third gain value (g3) by inputting the second gain value (g2), the second noise value, the second posteriori signal-to-noise ratio, and the second priori signal-to-noise ratio to the trained neural network model.

In an embodiment, the step S2160 of converting the second audio signal (s2) to the third audio signal (s3) may include identifying a noise component corresponding to the second audio signal (s2) based on the third gain value (g3), and converting the second audio signal (s2) to the third audio signal (s3) by removing the noise component from the second audio signal (s2).

In an embodiment, the controlling method may further include the steps of identifying a noise signal based on the first audio signal (S1), generating a reverse noise signal based on the noise signal, and combining the first audio signal (S1) and the reverse noise signal to obtain a first filtering signal, and the step S2160 of converting the second audio signal (s2) to the third audio signal (s3) may include converting the second audio signal (s2) to the third audio signal (s3) based on the first filtering signal and the third gain value (g3).

In an embodiment, the step S2110 of obtaining the first audio signal (s1) may include obtaining the first audio signal (s1) from an external device connected to the electronic apparatus 100.

The methods according to the above-described various embodiments of the disclosure may be implemented, for example, in the form of an application which may be installed in the existing electronic apparatus.

Alternatively, the methods according to the above-described various embodiments may be implemented only by software upgrade or hardware upgrade of the existing electronic apparatus.

Alternatively, the above-described various embodiments may be performed through an embedded server included in the electronic apparatus, or an external server of at least one of the electronic apparatus or the display device.

Meanwhile, according to an embodiment, the above-described various embodiments may be implemented in software including an instruction stored in a machine-readable storage medium that can be read by a machine (e.g., a computer). A machine may be a device that invokes the stored instruction from the storage medium and be operated based on the invoked instruction, and may include an electronic apparatus according to the disclosed embodiments. In a case that the instruction is executed by the processor, the processor may directly perform a function corresponding to the instruction or other components may perform the function corresponding to the instruction under the control of the processor. The instruction may include codes generated or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to an embodiment, the above-described various embodiments may be provided by being included in a computer program product. The computer program product may be traded as a product between a seller and a purchaser. The computer program product may be distributed in a form of the storage medium (e.g., a compact disc read only memory (CD-ROM)) that may be read by the machine or online through an application store (e.g., PlayStore™). In a case of the online distribution, at least portions of the computer program product may be at least temporarily stored or temporarily generated in a storage medium such as a memory of a server of a manufacturer, a server of an application store or a relay server.

In addition, each component (e.g., module or program) in the various examples described above may include one entity or a plurality of entities, and some of the corresponding sub-components described above may be omitted or other sub-components may be further included in the various examples. Alternatively or additionally, some of the components (e.g., modules or programs) may be integrated into one entity, and may perform functions performed by the respective corresponding components before being integrated in the same or similar manner. Operations performed by the modules, the programs, or other components in the various examples may be executed in a sequential manner, a parallel manner, an iterative manner, or a heuristic manner, or at least some of the operations may be performed in a different order or be omitted, or other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
a memory configured to store at least one instruction; and
at least one processor, comprising processing circuitry, connected to the memory to control the electronic apparatus,
wherein the at least one processor is configured, individually and/or collectively, to control the electronic apparatus, by executing the at least one instruction, to:
obtain a first audio signal including a voice signal and a noise signal;
convert the first audio signal in a time domain to a second audio signal in a frequency domain;
obtain a first gain value representing a Signal-to-Noise Ratio (SNR) from the second audio signal;
obtain a second gain value with a first dynamic range by filtering the first gain value;
obtain a third gain value by inputting the second gain value to a neural network model trained to output a signal from which noise is removed; and
convert the second audio signal to a third audio signal from which at least a portion of the noise signal is removed, using the third gain value,
wherein the at least one processor is configured, individually and/or collectively, to control the electronic apparatus, by executing the at least one instruction, to:
obtain a first noise value, a first posteriori SNR, and a first priori SNR based on the second audio signal;
obtain the first gain value based on at least one of the first noise value, the first posteriori SNR or the first priori SNR;
obtain a second noise value with a second dynamic range by filtering the first noise value:
obtain a second posterior SNR with a third dynamic range by filtering the first posteriori SNR;
obtain a second priori SNR with a fourth dynamic range by filtering the first priori SNR;
obtain the third gain value by inputting the second gain value, the second noise value, the second posterior SNR, and the second priori SNR to the trained neural network model:
identify a noise component corresponding to the second audio signal based on the third gain value; and
convert the second audio signal to the third audio signal by removing the noise component from the second audio signal.

2. The electronic apparatus as claimed in claim 1, wherein the at least one processor is configured, individually and/or collectively, to control the electronic apparatus, by executing the at least one instruction, to back-convert the third audio signal in a frequency domain to a fourth audio signal in a time domain.

3. The electronic apparatus as claimed in claim 1, wherein the at least one processor is configured, individually and/or collectively, to control the electronic apparatus, by executing the at least one instruction, to convert the first audio signal to the second audio signal using Short-Time Fourier Transform (STFT).

4. The electronic apparatus as claimed in claim 1, wherein the at least one processor is configured, individually and/or collectively, to control the electronic apparatus, by executing the at least one instruction, to:
obtain the first noise value from the second audio signal based on a first parameter stored in the memory;
obtain the first posteriori SNR from the second audio signal and the first noise value based on a second parameter stored in the memory;
obtain the first priori SNR from second audio signal and the first posteriori SNR based on a third parameter stored in the memory; and
obtain the first gain value from the second audio signal and the first priori SNR based on a fourth parameter stored in the memory.

5. The electronic apparatus as claimed in claim 1, wherein the at least one processor is configured, individually and/or collectively, to control the electronic apparatus, by executing the at least one instruction, to:
identify the noise signal based on the first audio signal;
generate a reverse noise signal based on the noise signal;
obtain a first filtering signal by combining the first audio signal and the reverse noise signal; and
convert the second audio signal to the third audio signal based on the first filtering signal and the third gain value.

6. The electronic apparatus as claimed in claim 1, wherein the electronic apparatus further comprises a communication interface connected to an external device; and
wherein the at least one processor is configured, individually and/or collectively, to control the electronic apparatus, by executing the at least one instruction, to obtain the first audio signal from the external device through the communication interface.

7. A controlling method of an electronic apparatus, the method comprising:
obtaining a first audio signal including a voice signal and a noise signal;
converting the first audio signal in a time domain to a second audio signal in a frequency domain;
obtaining a first gain value representing a Signal-to-Noise Ratio (SNR) from the second audio signal;
obtaining a second gain value with a first dynamic range by filtering the first gain value;
obtaining a third gain value by inputting the second gain value to a neural network model trained to output a signal from which noise is removed; and
converting the second audio signal to a third audio signal from which at least a portion of the noise signal is removed, using the third gain value,
wherein the obtaining of the first gain value comprises:
obtaining a first noise value, a first posteriori SNR, and a first priori SNR based on the second audio signal; and
obtaining the first gain value based on at least one of the first noise value, the first posteriori SNR or the first priori SNR,
wherein the method further comprises:
obtaining a second noise value with a second dynamic range by filtering the first noise value;
obtaining a second posterior SNR with a third dynamic range by filtering the first posteriori SNR; and
obtaining a second priori SNR with a fourth dynamic range by filtering the first priori SNR,
wherein the obtaining of the third gain value comprises;
obtaining the third gain value by inputting the second gain value, the second noise value, the second posterior SNR, and the second priori SNR to the trained neural network model,
wherein the converting of the second audio signal to the third audio signal comprises;

identifying a noise component corresponding to the second audio signal based on the third gain value; and converting the second audio signal to the third audio signal by removing the noise component from the second audio signal.

8. The method as claimed in claim 7, further comprising: back-converting the third audio signal in a frequency domain to a fourth audio signal in a time domain.

9. The method as claimed in claim 7, wherein the converting of the first audio signal to the second audio signal comprises converting the first audio signal to the second audio signal using Short-Time Fourier Transform (STFT).

10. The method as claimed in claim 7, wherein the obtaining of a first gain value comprises:

obtaining the first noise value from the second audio signal based on a first parameter stored in the electronic apparatus;

obtaining the first posteriori SNR from the second audio signal and the first noise value based on a second parameter stored in the electronic apparatus;

obtaining the first priori SNR from second audio signal and the first posteriori SNR based on a third parameter stored in the electronic apparatus; and obtaining the first gain value from the second audio signal and the first priori SNR based on a fourth parameter stored in the electronic apparatus.

11. The method as claimed in claim 7, further comprising:

identifying the noise signal based on the first audio signal;

generating a reverse noise signal based on the noise signal; and obtaining a first filtering signal by combining the first audio signal and the reverse noise signal, wherein the converting of the second audio signal to the third audio signal comprises converting the second audio signal to the third audio signal based on the first filtering signal and the third gain value.

12. The method as claimed in claim 7, wherein the obtaining of a first audio signal comprises obtaining the first audio signal from an external device connected to the electronic apparatus.

* * * * *